United States Patent [19]

Kurosawa et al.

[11] Patent Number: 5,297,239
[45] Date of Patent: Mar. 22, 1994

[54] COMPILE TYPE KNOWLEDGE PROCESSING TOOL, A HIGH-SPEED INFERENCE METHOD THEREFOR AND A SYSTEM USING THE TOOL

[75] Inventors: Kenichi Kurosawa; Masaru Shimada, both of Hitachi; Hirokazu Hirayama, Yokohama; Tadaaki Bandoh, Ibaraki; Kiyomi Mori, Hitachi, all of Japan

[73] Assignee: Hitachi, Ltd., Tokyo, Japan

[21] Appl. No.: 883,592

[22] Filed: May 13, 1992

Related U.S. Application Data

[63] Continuation of Ser. No. 469,918, Jan. 24, 1990, abandoned.

[30] Foreign Application Priority Data

Jan. 25, 1989 [JP] Japan .................. 1-013944

[51] Int. Cl.$^5$ .................. G06F 15/18; G06F 15/40; G06F 9/44
[52] U.S. Cl. .................. 395/75; 395/51
[58] Field of Search .................. 395/64, 75, 51

[56] References Cited

U.S. PATENT DOCUMENTS

| | | | |
|---|---|---|---|
| 4,763,277 | 8/1988 | Ashford et al. | 364/513 |
| 4,890,240 | 12/1989 | Loeb et al. | 364/513 |
| 4,924,408 | 5/1990 | Highland | 364/513 |

OTHER PUBLICATIONS

Forgy, C. L., "Rete: A Fast Algorithm for the Many Pattern/Many Object Pattern Match Problem", Artificial Intelligence, 19, 1982, 17-37.

Tano et al., "Eureka-II: A Programming Tool for Knowledge-Based Real Time Control Systems," Intl. Workshop on Artificial Intelligence for Industrial Applications, May 25-27, 1988, 370-375.

Takenaka et al., "Expert System Building Tool for Process Control: Marks-II," Intl. Workshop on Artificial Intelligence for Industrial Applications, May 25-27, 1988, 376-381.

*Primary Examiner*—Michael R. Fleming
*Assistant Examiner*—Robert W. Downs
*Attorney, Agent, or Firm*—Antonelli, Terry, Stout & Kraus

[57] ABSTRACT

High-speed inference method and system for a production system represented by an expert system. A knowledge base comprised of a rule and a fact possessing a plurality of attributes is converted into machine language instructions executable by a processor to execute inference. The machine language instruction of the fact has the function of transferring a value of the fact to a specified location and the machine language instruction of the rule has the function of performing matching decision by referring to the specified location. The number of pattern matching operations can be decreased and the interpretation overhead can be reduced to ensure high-speed inference.

1 Claim, 37 Drawing Sheets

FIG.4

```
( rule 1   if                              ( class  fa   super-class  system
     (? X  @ class= fb                              @  b            1        )
           @ d-> ? Y X  )
     (? Y  @ class= fa                     ( class  fb   super-class  system
           @ b< 1 0                                 @  d            1
           @ frame-name -> ? Z)                     @  e            2        )
           then   ····    )
                                           ( fa 1       class        fa      )
( rule 2   if
     (? X  @ class= fa                     ( fb 1       class        fb      )
           @ b< 1 0     )
     (? Y  @ class= fb                     ( fb 2       class        fb      )
           @ e= 2
           @ d-> ? Y X  )
           then   ····    )
```

F I G. 5
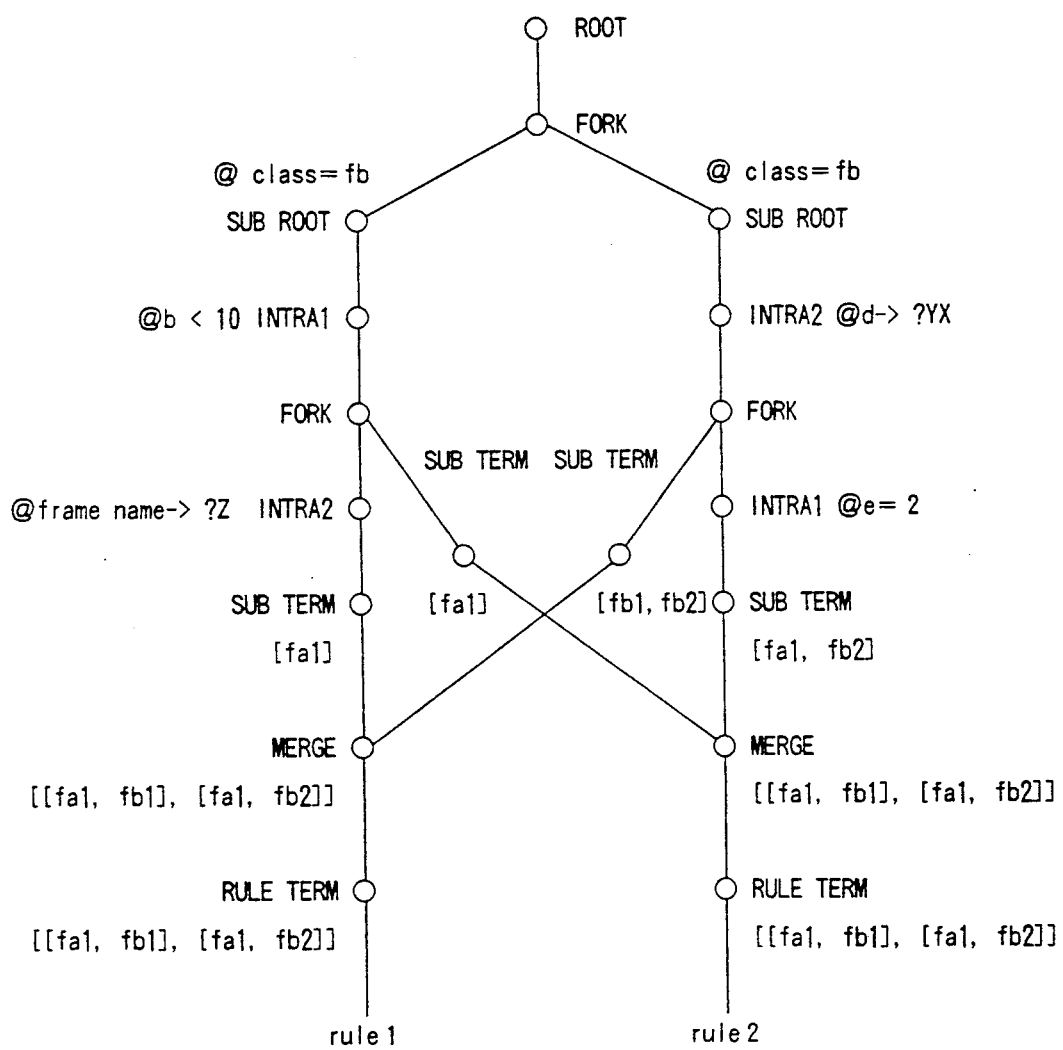

VARIABLE VALUE : VARIABLE VALUE APPEARING IN COMMON TO LHS AND RHS

FIG. 17

17-1: create FCB L1
```
move AG1, -(SP)
move AG2, -(SP)
move NGR, -(SP)
      jsr L1
```

17-2: modify FCB L2
```
adda #12, SP
move (SP), AG1
move -(SP), AG2
move -(SP), NGR
      jsr L2
```

17-3: delete FCB L3
```
adda #4, SP
move (SP)+, NGR
move (SP)+, AG2
move (SP)+, AG1
      Bra L3
```

17-4: create RCB R1
```
move AG4, -(SP)
move NGR, -(SP)
      jsr R1
```

17-5: modify RCB R2
```
adda #8, SP
move (SP), AG4
move -(SP), NGR
      jsr R2
```

17-6: delete RCB R3
```
adda #4, SP
move (SP)+, NGR
move (SP)+, AG4
      Bra R3
```

FIG. 18

18-1:
```
        ucsti #Imm, AGi cmpi  #-1,  AGi
        beq   undf
        cmpi  #Imm, AGi
        beq   return
        move  (SP), ao
        jump  (ao)
undf  : move  #Imm, AGi
return:
```

F I G. 19

```
/*******************************/
/*          BENCH1             */
/*******************************/

@frame
   ( fa  super-class  system    ⎫
              b          0      ⎬ 19-1
              c          1   )  ⎭
   ( fa1  class      fa      )  } 19-2

@rule
   ( ra  if                      ⎫
         ( ?X  @class-name=fa    ⎪
               @c =1             ⎬ 19-3
               @b<4         )    ⎪
         then                    ⎪
   ( send  ?X  assign (b. @b+1 ))⎭
```

F I G. 20

| CONTENTS OF REGISTER | | REGISTER NAME |
|---|---|---|
| FRAME | CLASS FRAME NUMBER | d 0 |
| | NUMBER OF FRAME OF INTEREST | d 1 |
| | TIME TAG ADDRESS | a 2 |
| | SLOT REGISTER FOR SLOT b | d 2 |
| | SLOT REGISTER FOR SLOT c | d 3 |
| CONTROL | NGR | d 7 |
| RULE EXECUTION PART | TIME TAG ADDRESS FOR MODIFIED FRAME | a 3 |
| | CONSTANT NUMBER INSTRUCTION CODE ADDRESS FOR MODIFIED FRAME | a 4 |

20-1

F I G. 21
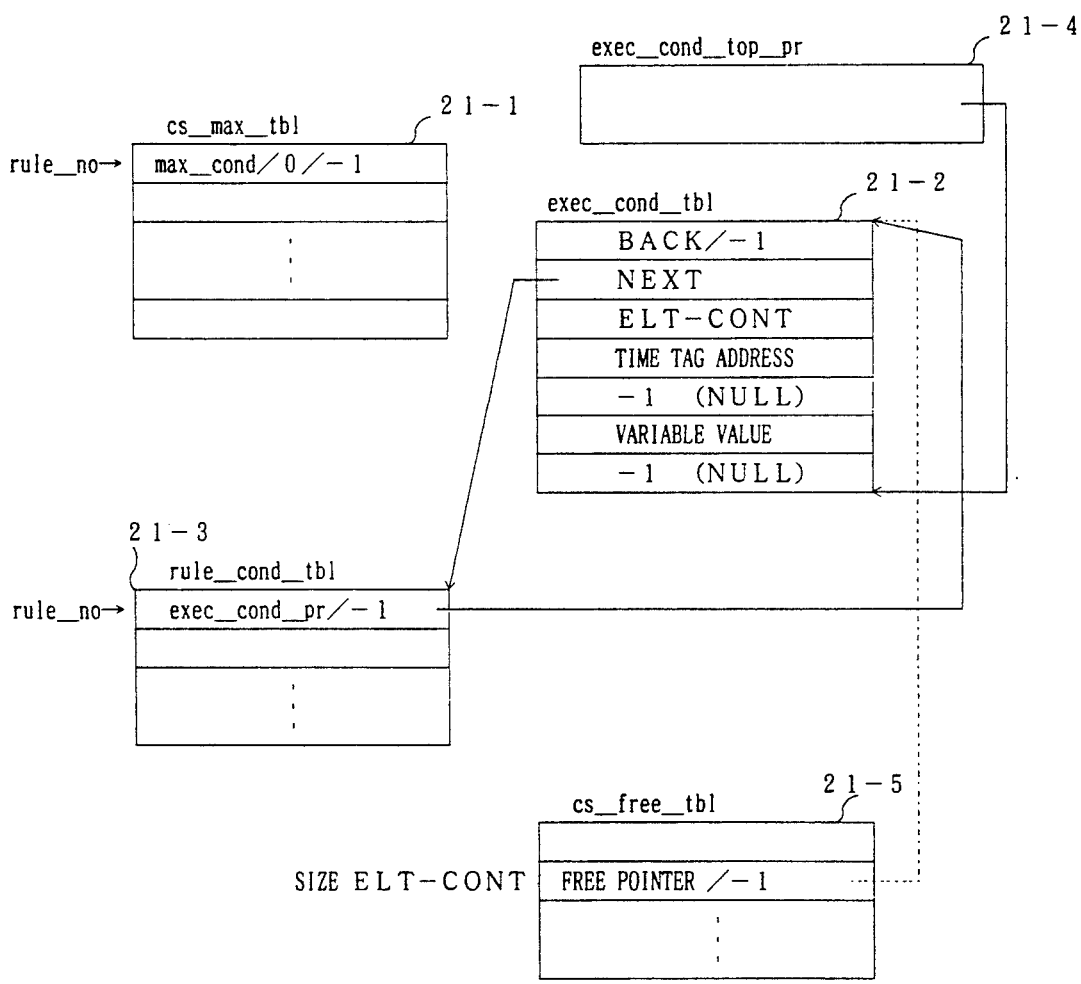

F I G. 23
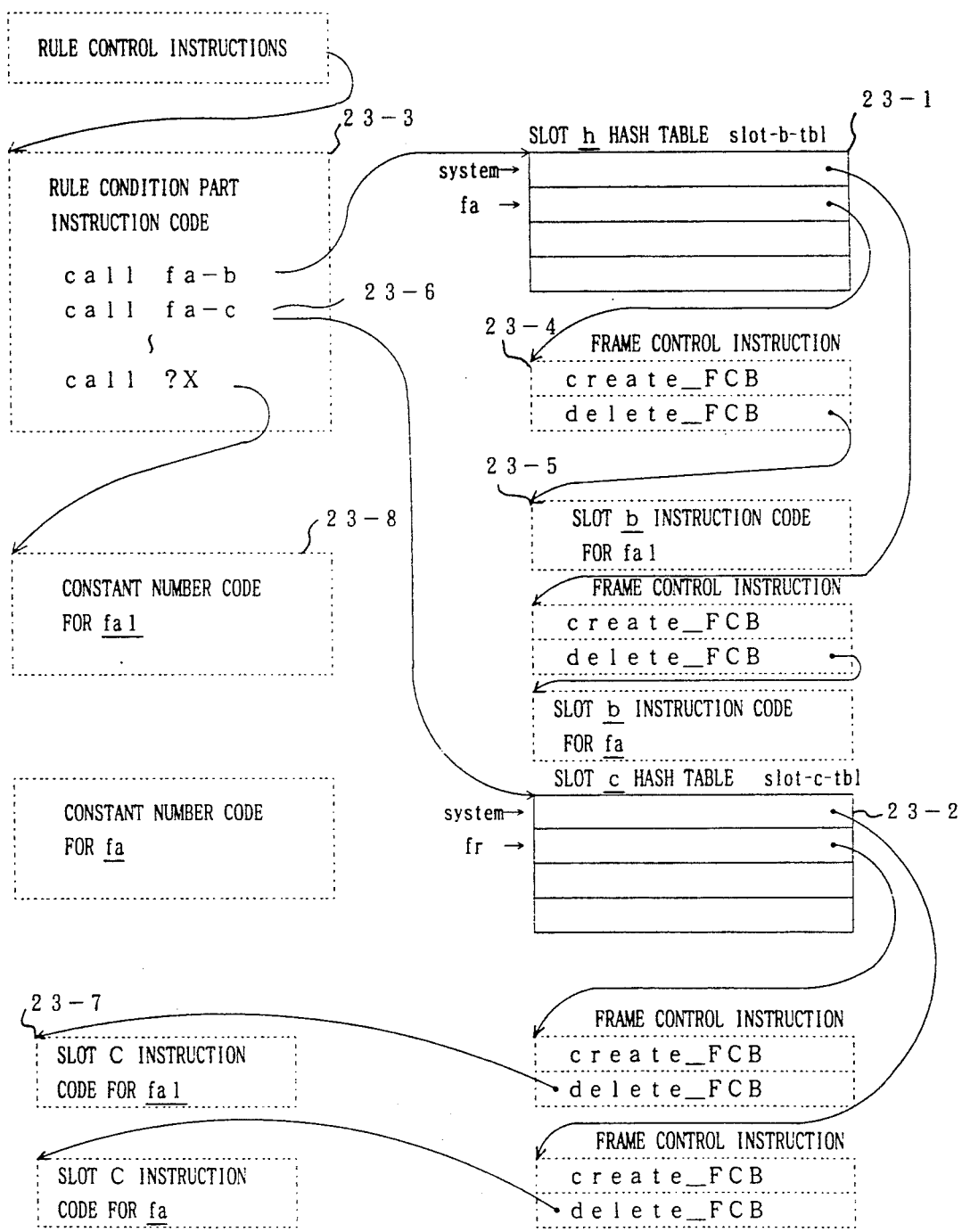

FIG. 25

```
        /*execution start*/                                              ⎫
        move.l    LBL0        , d 7   /* N G R */                        ⎬ 25-1 bra       INIT        ,       /*conflict set initialization*/    ⎭
        /*conflict resolution*/                                          ⎫
LBL0  : movea.l   $cs-max-tbl , a 4                                      ⎬ 25-2
        clr.l     d 1                                                    ⎭
LBL1  : move.l    (a4)+       , d 0   /* max_cond setting*/              ⎫
        cmpi.l    $-2         , d 0   /* cs_max_tbl search end*/         ⎪
        beq       SOLVED                                                 ⎬ 25-3
        cmpi.l    $ 0         , d 0   /* maximum executable condition is */
                                      /* not set */                      ⎪
        beq       SEARCH                                                 ⎭
LBL5  : addi.l    $ 4         , d 1                                      } 25-4
        bra       LBL1                                                   } 25-5
SEARCH: move.l    d 1         , d 2
        movea.l   $rule-cont-tbl, a 0
        adda.l    d 2         , a 0
        movea.l   (a0)        , a 2   /* exec.cond.Pr */
LBL4  : movea.l   a 2         , a 3   /* maximum executable condition address */
                                      /* setting */
LBL3  : movea.l   (a2)        , a 2   /* BACK */
        cmpa.l    $-1         , a 2   /* absence of executable condition*/
        beq       LBL6
        lea.l     12 (a3)     , a 0   /* time tag address for maximum executable */
                                      /*   condition */
        lea.l     12 (a2)     , a 1   /* time tag address for executable condition */
LBL7  : cmpi.l    $-1         , (a0)  /* completion of comparison for all time tags */
        beq       LBL3
        move.l    (a0)+       , d 2   /* time tag value for maximum executable */
                                      /* condition */
        move.l    (a1)+       , d 3   /* time tag value for executable condition */
        cmp.l     d 3         , d 2
        bgt       LBL3
        blt       LBL4
        bra       LBL7
LBL6  : move.l    a 3         , -4 (a4)  /* maximum executable condition setting */
        bra       LBL5
```

FIG. 26

```
SOLVED : movea.1  $cs-max-tbl , a 4
         clr.l    d 1                   /* Fr-no for maximum executable */
                                        /* condition */                    ⎫
LBL10 : movea.1   (a4)+      , a 3      /* maximum executable condition */ ⎪
                                        /* address */                      ⎪
         cmpa.1   $-2        , a 3      /* cs-max-tbl search end */        ⎪
         beq      END                   /* inference end */                ⎬ 26-1
         cmpa.1   $-1        , a 3      /* absence of executable condition */ ⎪
         bne      LBL 11               /* finding of executable condition */ ⎪
         addi.l   $ 4        , d 1      /* Fr-no×4 modification and holding */ ⎭
         bra      LBL 10                /* examination of executable condition */
                                        /* for the succeeding rule */

LBL11 : movea.1   $cs-max-tbl , a 4                                        ⎫
         clr.l    d 2                                                      ⎪
LBL2  : movea.1   (a4)+      , a 2      /* max-cond setting */             ⎪
         cmpa.1   $-2        , a 2      /* cs-max-tbl search end */        ⎬ 26-2
         beq      MAX-END               /* finding of maximum executable */ ⎪
                                        /* condition */                    ⎪
         cmpa.1   $-1        , a 2      /* absence of executable conditions */ ⎭
         bne      CMP                   /* comparison for executable */
                                        /* condition */                    ⎫
LBL8  : addi.l   $ 4        , d 2      /* Fr-no×4 modification */          ⎬ 26-9
         bra      LBL2                  /* examination of executable condition */ ⎭
                                        /* for the succeeding rule */

CMP   : movea.1  12 (a3)    , a 0      /* time tag address for maximum */  ⎬ 26-3
                                        /* executable condition */ movea.1  12 (a2)    , a 1      /* time tag address for executable */ ⎬ 26-4
                                        /* conditions */

LBL12 : cmpi.l   $-1        , (a0)     /* coincidence of executable */    ⎫
                                        /* conditions */                   ⎪
         beq      LBL8                  /* retrieval of the succeeding rule */ ⎪
         move.1   (a0)+      , d 3      /* time tag */                     ⎪
         move.1   (a1)+      , d 4      /* time tag */                     ⎬ 26-5
         cmpi.l   d 4        , d 3      /* time tag comparison */          ⎪
         bgt      LBL8                  /* retrieval of the succeeding rule */ ⎭
         blt      LBL9                  /* maximum executable condition */ ⎬ 26-6
                                        /* exchange */
         bra      LBL12                 /* examination of the succeeding time */ ⎬ 26-8
                                        /* lag */

LBL9  : movea.l   a 2        , a 3      /* holding of maximum executable condition */ ⎫
         move.1   d 2        , d 1      /* holding of Fr-n for maximum */  ⎬ 26-7
                                        /* executable condition */          ⎪
         bra      LBL8                  /* retrieval of the succeeding rule */ ⎭
```

FIG. 27

```
MAX-END:movea.1   a 3            , a 0   /* maximum executable condition address */
        movea.1   (a 0)          , a 1   /* BACK value */                              } 27-1 adda.l    $ 4            , a 0
        movea.1   (a 0)          , a 2   /* NEXT value */
        move.1    a 1            ,(a2)   /* substitution into BACK of one */
                                         /* preceding executable condition */ cmpi.1    $-1            , a 1                                                 } 27-2
        beq       LBL 13
        adda.l    $ 4            , a 1
        move.1    a 2            ,(a1)   /* substitution into NEXT of the */
                                         /*   succeeding */

LBL13 : movea.1   $cs-free-tbl   , a 0
        move.1    8 (a3)         , d 0   /* ELT-CONT */                                } 27-3
        adda.l    d 0            , a 0   /
        move.1    (a0)           , d 0   /* free pointer */                            } 27-4
        move.1    a 3            , (a0)  /* registration */
        move.1    d 0            , (a3)  /* substitution of free pointer */            } 27-5
                                         /* into BACK */ movea.1   $rulc-cont-tdl , a 0
        adda.l    d 1            , a 0
        move.1    (a0)           , d 0                                                 } 27-6
        cmpi.l    $-1            , d 0   /* absence of executable condition */
        beq       LBL15
        movea.1   $cs-max-tbl    , a 0
        adda.l    d 1            , a 0                                                 } 27-8
        move.1    $ 0            , (a0)  /* setting of a pending foag in */
                                         /* cs-max-tbl */ bra       LBL14
LBL15 : movea.1   $cs-max-tbl    , a 0
        adda.l    d 1            , a 0                                                 } 27-7
        move.1    $-1            , (a0)  /* setting of "-1" in cs-max-tbl */
LBL14 : movea.1   $ rhs-adr-tbl  , a 0
        adda.l    d 1            , a 0
        movea.1   (a0)           , a 0   /* rule execution part instruction */         } 27-9
                                         /* code address */ move.1    $CYC           , d 7   /* N G R */
        jmp       (a0)
CYC   : bra       LBL0                   /* start of the succeeding inference */       } 27-10
                                         /* cycle */
```

FIG. 28

```
/*Execution part processing */
        movea.l  $ fr-data-tbl , a 0                                          ⎫
        move.l   20 (a3)       , d 1  /* variable X in executable condition */|
        lsl.l    $ 2           , d 1  /* 4 ×d1→d1 : offset */                  ⎬ 28-1
        adda.l   d 1           , a 0  /* fr-data-tbl entry address→a0 */       |
        movea.l  (a0)          , a 0  /* frb-mid-tbl address→a0 */             |
        movea.l  (a0)          , a 0  /* fr-val-tbl address→a0 */              ⎭
        lea.l    4 (a0)        , a 1  /* time tag address for modified */     ⎫
                                      /* frame */                              ⎬ 28-2
        cmpi.l   $-1           , 12(a0) /* absence of slot to be modified */   |
        beq      ERR1                                                          ⎭
        lea.l    20(a0)        , a 0  /* first slot address */                ⎫ 28-3
LBL21 : cmpi.l   $ h           , 8 (a0) /* comparison with slot name b */     ⎫
        beq      LBL20                                                         ⎬ 28-4
        adda.l   $ 16          , a 0                                           |
        bra      LBL21               /* retrieval of the succeeding slot */    ⎭
LBL20 : addi.l   $ 1           , 12 (a0) /* slot value modification */         } 28-5
        move.l   $ 1 mer       , a 0  /* address of timer */                  ⎫
        addi.l   $ 1           , (a0) /* timer modification */                 |
        move.l   (a0)          , (a1) /* modification of frame time tag */     ⎬ 28-6
        move.l   20(a3)        , d 0  /* setting of variable X (frame name) */|
                                      /* in d0 */                              ⎭
        move.l   a 1           , a 3  /* setting of time tag address for */   } 28-7
                                      /* modified frame in a3 */
        lsl.l    $ 2           , d 0                                          ⎫
        movea.l  $ fr-no-tbl   , a 0                                           |
        adda.l   d 0           , a 0                                           |
        movea.l  (a0)          , a 0  /* address of slot-no-tbl */             ⎬ 28-8
        move.l   $ b           , d 0  /* offset of entry of slot b */          |
        adda.l   d 0           , a 0                                           |
        move.l   (a0)          , a 0  /* rule control instruction address */   ⎭
        move.l   4 (a3)        , a 4  /* constant number instruction code */  ⎫
                                      /* address */                            |
        jmp      (a0)                 /* branching to rule control */          ⎬ 28-9
                                      /* instruction */                        ⎭
```

FIG. 29

```
          /* rule control instruction */
          move.1    a 4            , -(sp)  /*create-RCB:constant number code */  ⎫
                                            /*address */                          ⎪
          move.1    d 7            , -(sp)  /* NGR */                             ⎬ 29-1
          jsr       RL1                                                           ⎪
          adda.1    $ 4            , s p    /* delete-RCB */                      ⎭
          move.1    (sp)+          , d 7    /* NGR */                             ⎫
                                                                                  ⎬ 29-7
          movea.1   (sp)+          , a 4    /* fourth register */                 ⎪
          bra       RL2                                                           ⎭
          /* rule condition part instruction code */
          /* conflict set deletion */
RL1   : movea.1    $cs-max-tbl    , a 0                                           ⎫
          adda.1    d 1            , a 0                                          ⎪
          move.1    (a0)           , d 3    /* max-cond */                        ⎬ 29-2
          movea.1   $rule-conl-tbl, a 0                                           ⎪
          adda.1    d 1            , a 0                                          ⎪
          movea.1   (a0)           , a 2    /* exec-cond-pr */                    ⎭
LOOP1 : cmpa.1     $-1            , a 2                                           ⎫
          beq       CS-END                                                        ⎬ 29-3
          move.1    12(a2)         , d 2    /* time tag */                        ⎫
          cmpa.1    d 2            , d 3    /* time tag address comparison */     ⎬ 29-4
          bne       NEXT                    /* retrieval of the succeeding */     ⎪
                                            /* executable condition */            ⎭
          cmp.1     a 2            , d 3    /* coincidence with maximum */        ⎫
                                            /* executable condition */            ⎪
          beq       MAX-DEL                 /* cs-max-cond correction */          ⎬ 29-5
CUT0  : movea.1    4 (a2)         , a 0    /* holding of NEXT */                  ⎭
          move.1    (a2)           ,(a0)    /* setting in BACK of one preceding */⎫
                                            /* executable condition */            ⎪
          cmpi.1    $-1            ,(a2)    /* decision as to whether BACK is */  ⎬ 29-6
                                            /* final */                           ⎪
          beq       FREE                    /* cs-free-tbl registration */        ⎪
          movea.1   (a2)           , a 1    /* setting of the succeeding executable */
                                            /* condition address */               ⎪
          move.1    4 (a2)         , 4(a1)  /* setting of NEXT */                 ⎭
```

FIG.30

```
FREE : movea.1    $cs-free-tbl  , a 0                                          ⎫
       move.1     8 (a2)        , d 0   /* ELT-CONT */                          │
       adda.l     d 0           , a 0                                           │
       move.1     (a0)          , d 0   /* pointer in cs-free-tbl */            │
       move.1     a 2           ,(a0)   /* registration in cs-free-tbl */      ⎬ 30-2
       move.1     d 0           ,(a0)   /* connection to free pointer */        │
       movea.1    a 1           , a 2   /* the succeeding executable condition */
                                        /* address */                           │
       bra        LOOP1                                                         ⎭
NEXT : movea.1    (a2)          , a 2   /* retrieval of the succeeding */
                                        /* executable condition */
       bra        LOOP1
MAX-DEL:movea.1   $cs-max-tbl   , a 0                                          ⎫
       adda.l     d 1           , a 0                                           │
       move.1     $ 0           ,(a0)   /* because of deletion of the */       ⎬ 30-1
                                        /* maximum executable condition */      │
       bra        CUT0                  /* a pending flag is set temporarily */⎭
CS-END:movea.1    $rule-cont-tbl, a 0                                          ⎫
       adda.l     d 1           , a 0                                          ⎬ 30-3
       cmpi.l     $-1           ,(a2)   /* absence of executable condition */   │
       bne        C-END                                                         ⎭
       movea.1    $cs-max-tbl   , a 0                                          ⎫
       adda.l     d 1           , a 0                                           │
                                                                               ⎬ 30-4
       move.1     $-1           ,(a0)   /* change of pending flag to absence */ │
                                        /* flag */                              ⎭
C-END:bra         LHS                   /* branching to matching decision */  30-5
```

FIG. 31

```
         /* matching decision */
INIT  :move.l    a4          ,-(sp)/*create-RCB*/       ⎫
       move.l    d7          ,-(sp)/*NGR*/              ⎬ 31-1
       move.l    R0          ,-(sp)/*the succeeding rule control
                                   /*instruction address */      ⎭
       move.l    $fa         , d0  /*setting of class name in first */  ⎫ 31-2
                                   /*register */                        ⎭
       move.l    $-1         , d1  /*setting of frame name variable */  ⎫ 31-3
                                   /*flag in second register */         ⎭
       movea.l   $slot-c-tbl , a0  /*class hash table of slot c */   ⎫
       move.l    d0          , d7                                    ⎪
       andi.l    $0X0003     , d7  /*d7 setting of lower 2 bits of d7 */ ⎬ 31-4
       lsl.l     $2          , d7  /*d7 is quadrupled to create offset */⎪
       adda.l    d7          , a0                                    ⎭
       movea.l   (a0)        , a0  /*frame control insruction address */ ⎫ 31-5
                                   /*for slot c */                       ⎭
       move.l    LC          , d7  /*NGR*/                              ⎫
       jmp       (a0)              /*branching to frame control */      ⎬ 31-6
                                   /*instruction for slot c */          ⎭
LC    :move.l    d3          , a0  /* @c-1:slot register d3 for @c */   ⎫
       cmpi.l    $1          , (a0)                                     ⎬ 31-7
       hne       FAIL                                                   ⎭
       movea.l   $slot-b-tbl , a0  /*class hash table of slot b */
       move.l    d0          , d7
       andi.l    $0X0003     , d7
       lsl.l     $2          , d7  /*d7 is quadrupled to create offset */
       adda.l    d7          , a0
       movea.l   (a0)        , a0  /*frame control instruction address */
                                   /*for slot b */
       move.l    LB          , d7  /*NGR*/
       jmp       (a0)              /*branching to frame control */
                                   /*instruction for slot b */
LB    :move.l    d2          , a0  /* @b<4:slot register d2 for @b */  ⎫
       cmpi.l    $4          , (a0)                                    ⎬ 31-8
       bge       FAIL                                                  ⎭
       bra       ADD-CS                                                } 31-9
LHS   :move.l    L0          , d7  /*NGR*/                             ⎫ 31-10
       jmp       (a4)              /*branching to constant number */   ⎬
                                   /*instruction code */               ⎭
L0    :move.l    d3          , a0                                      ⎫
       cmpi.l    $1          , (a0)/* @c =1*/                          ⎪
       bge       FAIL                                                  ⎬ 31-11
       move.l    d2          , a0                                      ⎪
       cmpi.l    $4          , (a0)/* @b <4*/                          ⎪
       bge       FAIL                                                  ⎭
       bra       ADD-CS                                                } 31-12
```

FIG. 32

```
        /* Conflict set addition */
ADD-CS :movea.l   $CS-free-tbl, a0
        move.l    $2           , d7  /*ELT-CONT=2:time tag 1, variable 1 */
        lsl.l     $2           , d7  /*offset of size 2 */
        adda.l    d7           , a0
        cmpi.l    $-1          , (a0)/*absence of free executable */    ⎫ 32-1
                                     /*condition */                     ⎭
        bne       FR1               /*utilization of free executable */ ⎫ 32-2
                                     /*condition */                     ⎭
        movea.l   $exec-cond-top-P, a0/*reservation of new executable */ ⎫ 32-3
                                     /* condition area*/                 ⎭
        movea.l   (a0)         , a1 /*head address of conflict set table */⎫
        addi.l    $backel-size, (a0)/*modification of conflict set head */⎪ 32-4
                                     /*address */                         ⎬
        move.l    $2           ,8(a1)/*setting of additional executable */⎪
                                     /*condition in ELT-CONT */           ⎪
        bra       ADD-DS1           /*addition processing */              ⎭
ADD-CS2:move.l    $-1          , (a1)/*setting of additional executable */⎫ 32-7
                                     /*condition in BACK */               ⎭
        bra       MAKE
FR1    :movea.l   (a0)         , a1 /*free executable condition */
                                     /*address→a1 */
        move.l    (a1)         , (a0)/*the succeeding free executable */
                                     /*condition address→co-free-tbl */
ADD-CS :movea.l   $rule-cont-tbl, a4
        move.l    $rule-no     , d7 /* rule-no= 0 */                    ⎫
        lsl.l     $2           , d7 /*creation of offset of table */     ⎪ 32-5
        adda.l    d7           , a4                                     ⎬
        cmpi.l    $-1          , (a4)/*absence of executable condition */⎪
                                     /*before addition */                ⎭
        beq       ADD-CS2                                                  ⎫ 32-6
        movea.l   (a4)         , a0 /*executable condition address→a0 */
        move.l    a1           ,4(a0)/*setting of additional executable */
                                     /*condition address in NEXT */
        move.l    a0           , (a1)/*setting of executable condition in BACK */
                                     /*of additional executable condition */
MAKE   :move.l    a4           ,4(a1)/*NEXT */
        move.l    a1           , (a4)/*setting of executable condition in */
                                     /*rule-cont-tbl */
        lea.l     12(a1)       , a4 /*address of time tag address for */
                                     /*additional executable condition */
        move.l    a2           ,(a4)+/*time tag address=a2 setting */    ⎫ 32-8
        move.l    $-1          ,(a4)+/*NULL setting */                   ⎬
        move.l    d1           ,(a4)+/*frame NO of variable X=d1 setting */⎪
        move.l    $-1          ,(a4)+/*NULL setting */                   ⎭
```

FIG. 33

```
          movea.l   $CS-max-tbl  , a0                                          ⎫
          adda.l    d7           , a0  /*addition of offset of rule-no */      ⎬ 33-3
          cmpi.l    $-1          , (a0)/*absence of executable condition */    ⎭
          beq       MAX-CH1                                                    } 33-4
          cmpi.l    $0           , (a0)/*pendency of maximum executable */
                                       /*condition*/
          beq       S-MAX             /*start of maximum executable condition */
                                      /*setting processing */
          movea.l   12(a1)       , a4 /*time tag address for additional */
                                      /*executable condition→a4 */
          movea.l   (a4)         , d0 /*time tag*/
          movea.l   (a0)         , a0 /*maximum executable condition address in */
                                      /*→cs-max-tbl */
          movea.l   12(a0)       , a0 /*time tag address */
          cmp.l     (a0)         , d0 /*time tag comparison */
          bgt       MAX-CH1
          bra       FAIL
S-MAX    :movea.l   a1           , a4 /*maximum executable condition address→a4 */
          movea.l   12(a1)       , a2 /*time tag address */
          move.l    (a2)         , d0 /*maximum time tag→d0 */
LOOP2    :cmp.l     $-1          , (a1)/*absence of another executable condition */
          beq       MAX-CH2
          move.l    (a1)         , a1 /*the succeeding executable condition */
                                      /*address→a1 */
          movea.l   12(a1)       , a0 /*the succeeding time tag address */
          cmp.l     (a0)         , d0 /*time tag comparison */
          blc       C-CH
          bra       LOOP2            /*sequential examination of executable */
                                     /*condition */
C-CH     :movea.l   a1           , a4 /*exchange of maximum time tag address */
          move.l    (a0)         , d0 /*exchange of maximum time tag value */
          bra       LOOP2            /*sequential examination of executable */
                                     /*condition */
MAX-CH1  :move.l    a1           , (a0)/*setting of additional; executable */⎫
                                       /*condition in cs-max-tbl */          ⎬ 33-5
          bra       FAIL                                                      ⎭
MAX-CH2  :move.l    a4           , (a0)/*maximum executable condition address */
                                       /*→cs-max-tbl */
FAIL     :movea.l   (sp)         , a0                                         ⎫
          jmp       (a0)             /*end of rule condition part */          ⎬ 33-6
                                     /*instruction code */                    ⎭
R0       :adda.l    $4           , sp /*delete-RCB */                         ⎫
          move.l    (sp)+        , d7                                         ⎬(33-1)
          move.l    (sp)+        , a4                                         ⎭
RL2      :movea.l   d7           , a0 /*rct instruction processing */         ⎫
          jmp       (a0)             /*branching to conflict resolution */    ⎬(33-2)
                                     /*processing CYC */                      ⎭
```

FIG. 34

```
/*Frame control instruction*/
/*Frame control instruction for slot b of frame fa1 */
    move.l    d0        , -(sp)  /*create-FCB:first register( class name )*/
    move.l    d1        , -(sp)  /*second register ( frame name of interest )*/
    move.l    d7        , -(sp)  /*NGR*/
    jsr       FAIL               /*the succeeding inctruction address*/
    adda.l    $4        , sp     /*delete-FCB*/
    move.l    (sp)1     , d7
    move.l    (sp)+     , d1
    move.l    (sp)+     , d0
    bra       FA1-B
/*Frame control instruction for slot b of frame fa*/
    move.l    d0        , -(sp)  /*create-FCB*/
    move.l    d1        , -(sp)
    move.l    d7        , -(sp)
    jsr       FAIL
    adda.l    $4        , sp     /*delete-FCB*/
    move.l    (sp)+     , d7
    move.l    (sp)+     , d1
    move.l    (sp)+     , d0
    bra       FA1-B
/*Frame control instruction for slot b of frame fa1 */
    move.l    d0        , -(sp)  /*create-FCB*/     ⎫
    move.l    d1        , -(sp)                     ⎬ 34-1
    move.l    d7        , -(sp)                     ⎭
    jsr       FAIL
    adda.l    $4        , sp     /*delete-FCB*/     ⎫
    move.l    (sp)+     , d7                        ⎪
    move.l    (sp)+     , d1                        ⎬ 34-2
    move.l    (sp)+     , d0                        ⎪
    bra       FA1-C                                 ⎭
```

FIG. 35

```
/*Frame control instruction for slot c of frame fa*/
        move.l    d0        , -(sp)  /*create FCB*/
        move.l    d1        , -(sp)
        move.l    d7        , -(sp)
        jsr       FAIL
        adda.l    $4        , sp
        move.l    (sp)+     , d7
        move.l    (sp)+     , d1
        bra       FA-C
/*Slot b instruction code for fa1 */
FA1-B : ucsti    $fa       , d0     /*internal number of fa*/
        ucsti    $fa1      , d1     /*internal number fr-no of fa1 fr-no*/
        lea.l    $t-tag1   , a2     /*time tag address for fa1→a2*/
        move.l   $b        , d2     /*address of slot b of fa1→d2*/
        movea.l  d7        , a0     /*NGR*/
        jmp      (a0)
/*Slot b instruction code for fa1 */
FA-B  : ucsti    $system   , d0     /*internal number of system*/
        ucsti    $fa       , d1     /*internal number of fa*/
        lea.l    $t-tag    , a2     /*time tag address for fa→a2*/
        move.l   $b        , d2     /*slot b address for fa→d2*/
        move.l   d7        , a0     /*NGR*/
        jmp      (a0)
/*Slot c instruction code for fa1 */
FA1-C : ucsti    $fa       , d0     ⎫
        ucsti    $fa1      , d1     ⎪
        lea.l    $t-tag1   , a2     ⎬ 35-1
        move.l   $c        , d3     ⎪
        move.l   d7        , a0     ⎪
        jmp      (a0)              ⎭
```

FIG. 36

```
/*Slot_c instruction code for fa*/
FA-C  : ucsti    $system  , d0
        ucsti    $fa      , d1
        lea.l    $t-tag   , a2
        move.l   $c       , d3
        move.l   d7       , a0
        jmp      (a0)

/*Constant number instruction code for fa1*/
FA1   : move.l   $fa      , d0    ⎫
        move.l   $fa1     , d1    ⎪
        lea.l    $t-tag   , a2    ⎬ 36-1
        move.l   $b       , d2    ⎪
        move.l   $c       , d3    ⎪
        move.l   d7       , a0    ⎪
        jmp      (a0)             ⎭

/*Constant number instruction code for fa*/
FA    : move.l   $system  , d0
        move.l   $fa      , d1
        lea.l    $t-tag   , a2
        move.l   $b       , d2
        move.l   $c       , d3
        move.l   d7       , a0
        jmp      (a0)
```

F I G. 37

Test case if ( ?X @ class=fa     ⎫  
        @ b<5       ) ⎬ 37-1  
  ( ?Y @ class=fb     ⎭  
        @ e1 = 2     ⎫  
        @ e2 = 2     ⎪ 37-2  
        @ e3 = 2     ⎬  
        @ e4 = 2     ⎪  
        @ e5 = 2     ⎭  
then ( send ?X assign ( b,@b+1 ))} 37-3

```
( fa super-class system
      b           0
      c           1    )
( fa1   class      fa   )
( fb super-class system
      e1          2
      e2          2
      e3          2
      e4          2
      e5          2
```

FIG. 39

```
/*******************************/
/*          BENCH2              */
/*******************************/

@frame
 ( fa    class    system
         b         0
         c         1       )

@rule
 ( ra   if
   ( fa   @c=1
          @b<4           )
    then
  ( send  fa  assign (b. @b+1 )))
```

F I G. 40

```
/*******************************************************************/
/*                          BENCH3                                 */
/*******************************************************************/
@frame                      @rule
  ( fa super-class system     ( ra  if ( ?X  @class  = fb
            b         0                       @d     -> ?YX )
            c         1  )                ( ?Y @class  = fa
  ( fa1  class     system )                    @b     > 5
  ( fb super-class system                      @frame-name -> ?Z )
            d         0          then ( send ?Z assign (b. @b+1+?YX)))
            e         2  )   ( ra  if ( ?X  @class  = fa
  ( fb1  class     fb     )                    @b     > 5   )
  ( fb2  class     fb     )                ( ?Y @class  = fb
                                               @e     = 2
                                               @d     -> ?Z  )
                              then ( send ?X assign (b. @b+?Z+1)))
```

F I G. 41

| INFERENCE SCHEME | BENCH MARK 2 PERFORMANCE( RULES/S ) | BENCH MARK 3 PERFORMANCE( RULES/S ) |
|---|---|---|
| INTERPRETER TYPE ( RETE ) | 714 | 303 |
| COMPILE TYPE | 60052 | 17765 |
| RATE OF IMPROVEMENT IN PERFORMANCE | 84 TIMES | 58 TIMES |

COMPILE TYPE KNOWLEDGE PROCESSING TOOL, A HIGH-SPEED INFERENCE METHOD THEREFOR AND A SYSTEM USING THE TOOL

This application is a continuation of application Ser. No. 469,918, filed Jan. 24, 1990 now abandoned.

BACKGROUND OF THE INVENTION

This invention relates to a production system represented by an expert system and more particularly to a tool for forward reasoning and a high-speed inference method using the tool.

In the past, the production system widely used as a tool for implementing the expert system includes, as shown in FIG. 2, a production memory 2-1 for storing rules, a working memory 2-2 for storing data necessary for execution of the rules, and an interpreter (inference engine) 2-3 which performs interpretation and execution by referring to or looking up the above two memories. Fundamentally, the interpreter repeats three cycles of pattern matching, conflict resolution and execution to perform execution processing repeatedly until no executable rule subsists. When data such as a frame representative of a fact is first supplied to the working memory, the pattern matching cycle proceeds wherein pattern matching is effected between a condition part of each of all the rules and the contents of the working memory at that time, so that for each rule, an executable condition constructed of a combination of facts may be created which makes the rule in question executable and satisfies the rule condition part. Subsequently, in the conflict resolution cycle, one executable condition is selected from the executable conditions of all rules in accordance with a certain strategy and a rule to which the selected executable condition belongs is selected. Finally, in the execution cycle, an execution part of the selected rule is executed on the basis of the selected executable condition to modify the facts stored in the working memory. The "certain strategy" referred to herein signifies a stipulation which determines the sequence of execution of rules in accordance with, for example, the time that the rule executable condition is created (time tag). The time-tag stipulation is derived from the thinking purporting that "inference based on a newly created executable condition (facts) can be done with higher efficiency".

In the production system outlined as above, the pattern matching processing is effected for all rules each time the pattern matching cycle is executed with the result that the same processing is repeated, thus degrading the processing efficiency. Under the circumstances, RETE algorithm has been proposed which is effective to reduce the number of operations of pattern matching between rule and fact. This algorithm is pattern matching algorithm practically used in many famous commercial tools such as OPS 5, ART, KBMS and ES/KERNEL.

Pursuant to the RETE algorithm, the rule condition part is converted into a data flow graph called a RETE network having nodes at which pattern decision commands are placed, and the data flow graph is so optimized as to eliminate the same pattern decision occurring among a plurality of rules. Further, the pattern decision is not repeated every cycle but the results obtained midway in calculation for the previous cycle are all conserved on the network, and only changes resulting from execution of the rules are subjected to pattern matching.

As is clear from the above, the RETE algorithm is highly efficient but conventionally, this algorithm has been practiced by expressing nodes of the network in terms of intermediate language form such as a list and a table and by causing an interpreter to perform interpretation and execution, thus raising a problem that satisfactory performance can not be realized.

To cope with this problem, a method such as OPS 83 has recently been employed by which the RETE network is converted into a direct procedure (Reference literature: Technique for Increasing the Speed of Production System by Tohru Ishida and Kazuhiro Kuwahara, Trans. Information Processing Society of Japan, Vol. 29, No. May 5, 1988).

The prior art described hereinbefore may be summarized as shown in FIG. 3. To explain, in place of decreasing the number of pattern matching operations at the condition part of each rule, an executable condition for the rule is conserved and besides intermediate results are also conserved on the RETE network as indicated at block 3-1 so that only modified frames may be again subjected to pattern matching. Also, by making a plurality of rules have common conditions in common in the network as indicated at block 3-2, the number of pattern decision operations can be reduced considerably to advantage.

However, where a great number of modified frames are present on the network, the prior art method suffers from a disadvantage that as indicated at block 3-3, all of the rule executable conditions and intermediate results must be modified and memory control is required for this purpose.

For example, a program consisting of rules and frames as shown in FIG. 4 can be converted into a RETE network, as shown in FIG. 5. A rule 1 of this program has the meaning of "If for an instance frame having a class name of fb, values of its attribute $d$ are substituted into variables Y and X and for an instance having a class name of fa, the value of its attribute $b$ is smaller than 10 and its frame name is substituted into variable Z" and statements following "then" constitute an execution part of the rule 1. A rule 2 is similar and its explanation will be omitted. As for the frame, there are two clase frames fa and fb and instance frames $fa_1$, $fb_1$ and $fb_2$. The initial value of attribute of the instance frame is the same as that of the class frame.

When examining features of this program in view of the RETE algorithm, the program will be proved to feature that conditions in the rule 1 resemble those in rule 2, thus permitting the program to be converted into a highly efficient RETE network in which the rules 1 and 2 can have common conditions in common, and that the frame name referred to in the rule condition part is represented by the variable so as to generate a plurality of intermediate results to be conserved on the network frame, thus reducing the number of pattern matching operations greatly. In effect, on the FIG. 5 RETE network, the rules 1 and 2 have the first condition of the rule 1 and the second condition of the rule 2 as well as the second condition of the rule 1 and the first condition of the rule 2 in common and the pattern decision results are conserved as intermediate results at SUB-TERM's and MERGE's on the network.

Consequently, the number of pattern decision operations effected when a frame referred to by the rule condition part is modified can be reduced considerably.

For example, when the instance frame $fa_1$ is modified, one matching decision operation is carried out at INTRA 1 of the first condition of the rule 1 but in the rule 2, only reference to intermediate results is made at SUB-TERM and therefore no matching decision is carried out. Accordingly, the number of matching decision operations is one in total.

However, this program is considered as one of programs which degrade the performance pursuant to the RETE algorithm the most. This is because while the number of matching decision operations can be reduced, it takes a long time to modify the intermediate results. For example, when $fa_1$ is modified, all intermediate results inclusive of $fa_1$ and conserved on the RETE network at two SUB-TERM's, MERGE, and RULE-TERM in the rule 1 and at MERGE and RULE-TERM in the rule 2 must be retrieved and deleted and besides new intermediate results must be prepared on the network.

As is clear from the above, the conservation of the intermediate results on the network is good for one thing but bad for another thing and it is risky to simply use only the number of pattern decision operations as an evaluation criterion for algorithm. Thus, in order to evaluate the RETE algorithm, two evaluation criteria are required including the number of pattern decision operations and the amount of modification of the intermediate results.

Another problem is encountered in the RETE algorithm in connection with implementation of the algorithm. Since in the RETE algorithm a data driving type execution mechanism is employed in which a modified frame is "drawn" into the network in accordance with a data flow model, a data flows computer must be realized virtually with an interpreter program (inference engine program) in implementing the RETE algorithm on an ordinary pipe-line computer and virtual instructions arranged on a rule network must be interpreted and executed by means of the interpreter. Thus, the virtual instructions have to be executed through the medium of the interpreter and disadvantageously, inference can not be executed with high efficiency. Under the circumstances, a system for increasing the processing speed has hitherto been available wherein pattern decision commands on the RETE network are converted into a machine language instruction set for computer. However, in a large-scale system in which the number of frames amounts up to several of thousands to several of ten thousands, the frame per se is expressed in terms of a table form such as a list and data, and therefore pointers are frequently brought into use in order to make reference to a frame and the frame reference operation disadvantageously causes a bottleneck in attaining satisfactory inference performance.

SUMMARY OF THE INVENTION

An object of this invention is to provide inference processing means capable of drastically improving the inference performance of a production system.

According to the invention, the above object can be accomplished by increasing the processing speed on the basis of the following design considerations.

(1) Reduction of the number of pattern matching operations

The number of rules to be executed and the number of frames to be referred to are limited through hash technique.

(2) Reduction of interpretation overhead

Rules and frames are both converted into machine language instruction sets and then executed.

More specifically, when considering conservation of the intermediate results in connection with item (1) above, trade-off between conservation case and non-conservation case is of a matter of importance and in accordance with the present invention, speed-up is achieved without conserving the intermediate results except for conflict set. In particular, since simple comparison and substitution are mainly used as matching operator described in the rule condition part, the matching decision does not consume much time. However, unless the number of rule groups to be executed and the number of frame groups to be referred to are limited as possible, the number of matching decision operations will increase exponentially and therefore it is intended by the present invention to limit the number of rules to be executed and the number of frames to be referred to through hash technique. Because of non-conservation of the intermediate results, it is of no use to make a plurality of rules have common conditions in common and therefore the common possession must be excluded and individual conditions in rules to be executed must be subjected to matching decision.

In the previously-described system based on the limitation of the number of rules to be executed and of frames to be referred to and which excludes the conservation of the intermediate results, the number of matching decision operations increases as compared to the RETE algorithm but this system or scheme is advantageous over the RETE algorithm in that processing of deleting and adding the intermediate results and memory control processing for conservation of the intermediate results are not at all needed.

To solve the other task of reducing the interpretation overhead, it is intended by the present invention to achieve speed-up by converting both the rules and frames into machine language instruction sets. However, the manner of implementing the compile type forward inference by using machine language instructions inclusive of frame machine language instructions has not hitherto been available and significant problems are encountered in how to realize the manner of expressing instructions in the frame, the manner of expressing instructions in the rule condition part and the manner of retrieving a conflict set by controlling the machine language.

According to the invention, three principal means are employed for implementing the aforementioned two design considerations, that is, (1) reduction of the number of pattern matching operations and (2) reduction of interpretation overhead, as will be described below.

First means is so-called compile type execution means which converts rules and frames into machine language instructions to permit direct execution of the rules and frames, in contrast to the inference based on so-called interpreter type execution means wherein pattern decision commands and frames representative of facts on the RETE network are expressed in terms of tables and data which are interconnected by pointers and inference is carried out by means of an interpreter.

Second means is means for reducing the number of matching decision operations which limits the number of rules to be executed and of frames to be referred to by using a hash table, in contrast to the reduction of the number of matching decision operations pursuant to the RETE algorithm which is achieved by conserving the intermediate results of matching decision obtained during the previous cycle in the memory.

Third means is means which controls, when a plurality of rules and frames result from the number limitation by means of the second means, all of the rules and frames with high efficiency.

It should be appreciated that the first means is independent of the second and third means and effective for all kinds of inference processing systems.

BRIEF DESCRIPTION OF THE DRAWINGS

FIG. 4 shows an example of a bench mark program used to explain features of the RETE algorithm;

FIG. 5 is a diagram showing a RETE network corresponding to the FIG. 4 bench mark;

FIG. 17 shows an example of implementation of frame control instructions and a rule control instruction set which are pursuant to the MC 68020 instruction;

FIG. 18 shows an example of implementation of an ucsti, #Imm and Agi instruction pursuant to the MC 68020 instruction;

FIG. 19 shows a bench mark program used in the embodiment;

FIG. 20 is a table showing the correspondence between the register name and the contents of a register;

FIG. 21 is a diagram showing the structure of cs-max-$tb_1$, rule-cont-$tb_1$, cs-free-$tb_1$ and exec-cond-top-pr which are used for controlling the conflict set;

FIG. 23 is a diagram showing the structure of a slot $\underline{b}$ hash table "slot-b-$tb_1$" and a slot $\underline{c}$ hash table "slot-c-$tb_1$";

FIGS. 25 to 36 show embodiments wherein the present invention is implemented by using instructions pursuant to the MC 68020;

FIG. 37 shows an example of a bench mark used for comparison of the system or scheme used in the present invention with the RETE algorithm;

FIGS. 39 and 40 show performance evaluation bench marks; and

FIG. 41 is a table showing the results of performance evaluation according to the bench marks of FIGS. 39 and 40.

DESCRIPTION OF THE PREFERRED EMBODIMENTS

The first or third means for implementing conversion of frames and rules into mechanical language instruction sets and control of conflict set retrieval can not be realized with the prior art and will first be described. The second means for reducing the number of matching decision operations will be described finally.

Generally speaking, the frame is classified into two kinds of frames of which one is a class frame indicative of the concept such as "university" and "human being" and the other is an instance frame indicative of the substance such as "University of Tokyo" and "Taro". Each of the class frame and instance frame can possess a plurality of attributes. For example, the class frame "university" possesses such attributes and "location" and "student number" and the instance frame "Taro" possesses such attributes as "height" and "weight". It is to be noted that the class frame is the concept and will not always be required to have attribute values but the instance frame is the substance and must have values of attributes as represented by, for example, "a height of 180 cm" and "a weight of 70 Kg" of "Taro". It is also to be noted that the instance frame necessarily belongs to one class frame and is related thereto in master and slave relationship.

Figure 6:
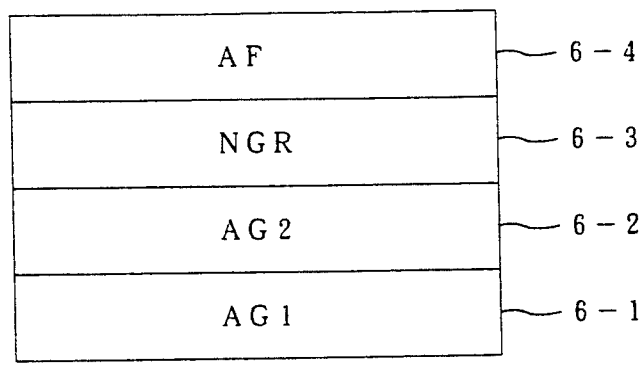
FIG. 6 is a diagram showing the construction of an embodiment of a FCB (frame control block) according to the invention.
Figure 7:
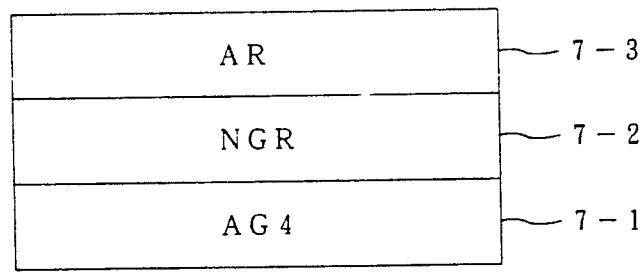
FIG. 7 is a diagram showing the construction of a RCB (rule control block)

Generally, as shown in FIG. 4, a plurality of conditions having frame names as variables can be described in the rule condition part and therefore controlling is needed for looking up all of frames to be referred to. In addition, in connection with the rule, controlling is needed which permits execution of all of rules referring to modified frames. To realize such compile type conflict set retrieval controlling, the present inventors have developed a control scheme called FB propagation (Forward and Backward propagation) wherein controlling for retrieval of rules and frames and return controlling for transfer of retrieval results to a referrer are used in combination. This scheme can be realized using in combination three kinds of control operations, i.e., a frame retreival sequence control block (FCB) which is created, modified and deleted on a stack as shown in FIG. 6, a rule retrieval sequence control operation effected using a rule control block (RCB) which is created, modified and deleted on the same stack as that for the FCB, as shown in FIG. 7 and a return control operation by which execution control for performing matching decision after reference to a frame is made is implemented. Referring to FIG. 6, the FCB has four kinds of information consisting of the contents AG1 (6-1) of a first register, the contents AG2 (6-2) of a second register, the contents NGR (6-3) of an address hold register for holding addresses used for return to the rule condition part when the rule condition part branches to the frame machine language instructions, and a frame machine language address to be executed next. On the other hand, the RCB as shown in FIG. 7 has three kinds of information consisting of the contents AG4 (7-1) of a fourth register, the contents NGR (7-2) of a register for holding an address of a call originator which calls out and executes a group of rules having condition parts which refer to modified frames, and a rule machine language instruction address AR (7-3) to be executed next. By using the FCB and RCB, retrieval controlling can be implemented with high efficiency as will be detailed later.

Figure 8:
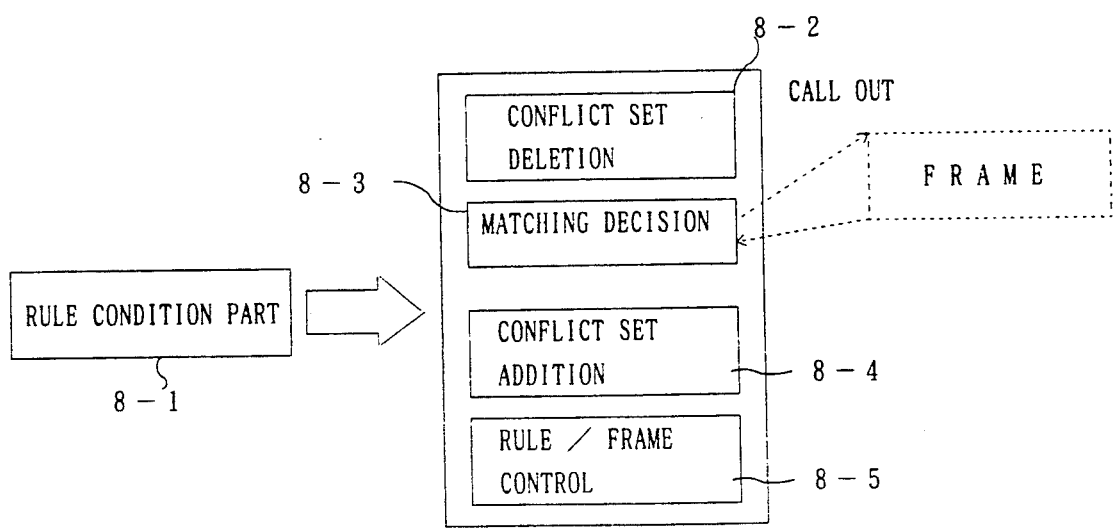
FIG. 8 is a diagram showing an example of a rule condition part expressed by machine language instructions.
Figure 9:
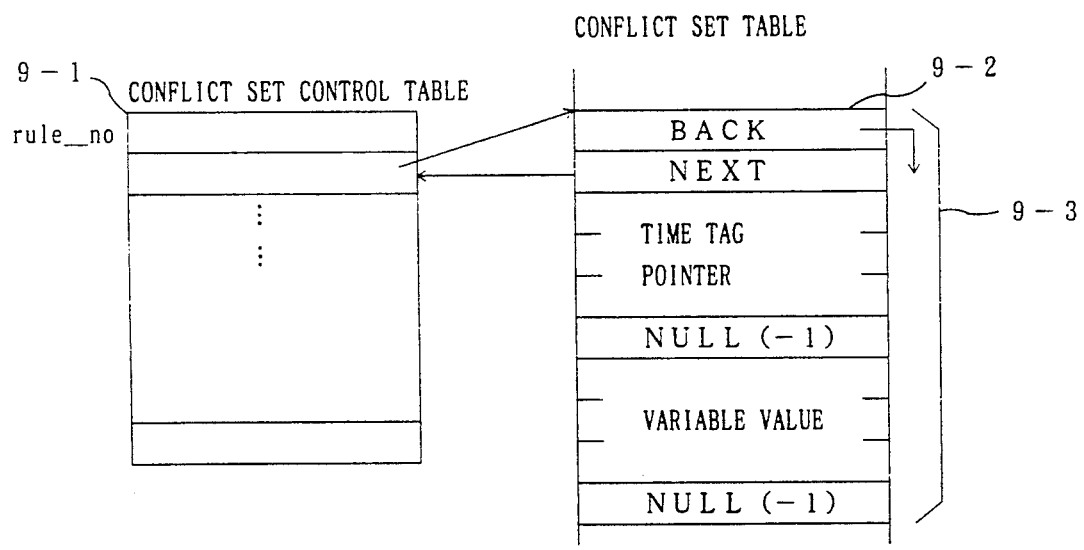
FIG. 9 is a diagram showing the construction of a conflict set control table and the construction of a conflict set table.

Since the above control scheme is deeply related to the manner of expressing instructions in the rule condition part and the frame, an instruction code of the rule condition part will first be described. Referring to FIG. 8, a rule condition part 8-1 has four kinds of instructions consisting of instructions 8-2 for deleting an executable condition inclusive of a modified frame from conflict set of the rule in question, instructions 8-3 for performing matching decision, instructions 8-4 for adding a new executable condition to the conflict set of that rule, and instructions 8-5 for execution and control of another frame and another rule condition part. With the FCB and RCB constructed as above, when an instruction code in a rule condition part is executed, an executable condition is deleted from a conflict set of the rule in question on the basis of a time tag address held in a register, a combination of time tags for frames which are determined to satisfy a new condition through matching decision is added to the conflict set, and an address of a machine language instruction of a frame to be referred to subsequently or of a rule to be executed subsequently is loaded from the FCB or RCB on the stack. FIG. 9 shows the construction of the conflict set subjected to the deletion and addition under the direction of the rule condition part instruction code. More specifically, a conflict set control table 9-1 holds addresses of individual rules having rule numbers as entry and by which the individual rules for the conflict set are accessed, and a conflict set table 9-2 has a combination of frames (a combination of time tag pointers) which makes a rule in question executable and a rule executable condition 9-3 consisting of values of variables taking place in common to the condition and execution parts of the rule. Generally, since a plurality of execution conditions exist which make a rule executable, a plurality of rule executable conditions are coupled together through BACK and NEXT cells. Consequently, in the conflict resolution and the conflict set deletion and addition instruction code in the rule condition part, the conflict set can be manipulated by making reference to a rule number of a rule in question. On the other hand, it is very important that the rule condition part can refer to a slot value of a frame at a high speed. Especially, when the rule condition contains a variable, the rule condition part refers to many frames and hence how an interface stipulation between the instruction code in rule condition part and the frame instruction code is set up is one of important points.

The frame machine language instructions and the interface stipulation will now be described.

In the scheme according to the present invention, an unmodified frame is also subjected to matching decision at the rule condition part as described previously. However, in general, only a small number of attributes of all attributes possessed by the frame are required to undergo matching decision at the rule condition. Therefore, preferably, the rule condition part does not always refer to all of the attributes but refers to a limited number of requisite attributes. On the other hand, in connection with a frame modified at the rule execution part, a plurality of rules exist in general which refer to the frame at the rule condition part and hence many attributes are considered to be referred to. Accordingly, two kinds of frame machine language instructions are prepared consisting of a machine language instructions (called a constant number instruction code) having all attributes to be referred to by the modified frame as indicated at 10-1 in FIG. 10 and a machine language instruction (called a slot instruction code) having attributes to be referred to by the unmodified frame as indicated at 10-2 in FIG. 10.

Firstly, when the constant number instruction code 10-1 is executed for reference through a branch instruction in the rule condition part, a class frame number to which a modified frame belongs is transferred to first register, a modified frame number per se is then transferred to the second register, a storage address for a time tag indicative of freshness in terms of time of the modified frame is then transferred to the third register, storage addresses for attribute values are transferred to attribute hold registers (called slot registers) corresponding definitely to or provided in one-to-one correspondence relationship with attribute names, and finally branching to the rule condition part standing for the call originator is effected using a return instruction ret. Under this condition, the rule condition part is allowed to make a matching decision by referring to the contents of each register. As will be seen from the above, the constant number instruction code sets up two interface stipulations to be observed between the rule and the frame. The slot instruction code also sets up the same interface stipulations as those established by the constant number instruction code. To explain, one of the stipulations stipulates that the first to third registers and the slot register should operate in accordance with their types to hold the class number, the frame number, the time tag address and the storage address for the attribute value. For example, the slot register corresponds definitely to or makes one-to-one correspondence to the attribute name and therefore, storage addresses for attribute values of the same attribute name which belong to different frames are held in the same slot register. This first stipulation permits the rule and the frame to exchange data and address therebetween through the registers.

The second stipulation stipulates that data should be stored in the first and second registers and addresses should be stored in the third and slot registers. As is clear from the above, the stipulations can ensure that in the production system in which inference is carried out by modifying the time tag and the attribute value, data necessary for inference can be arranged on the memory and can always be conserved. On the other hand, the frame number in the first and second register is not changed by the rule execution part and can therefore be embedded in the machine language instruction. In connection with the machine language instruction address for a modified frame, the head address of a constant number instruction code in the frame can be transferred to the fourth register when the frame is modified at the rule execution part, so that the rule condition part can execute the constant number instruction code by referring to the fourth register. Consequently, the rule condition part is allowed to refer to requisite frame information such as frame name and slot value through the registers.

Subsequently, when a slot instruction code is executed through the branch instruction in the rule condition part, coincidence is checked between an internal number of a class frame to which a frame in question belongs and the first register (ucsti #class-no, AG1 instruction), coincidence is then checked between an internal number of the frame per se and the second register (ucsti #Fr-no, AG2 instruction), a storage address for a time tag indicative of freshness in terms of time of that frame is transferred to the third register (move adr (time tag), AG3 instruction), storage addresses for the attribute values are transferred to attribute hold registers provided in one-to-one correspondence relationship with attribute names (move adr (slot 1), SR1 instruction), and finally branching to the rule condition part standing for the call originator is performed using a return instruction ret. Under this condition, the rule condition part is allowed to make a matching decision by referring to the contents of the registers. Thus, the slot instruction code is different from the constant number instruction code or machine language instructions of all attributes in that the former code performs the coincidence check between each of the first and second registers and the frame internal number and that one instruction is used for transferring the storage address for the attribute value to the attribute hold register.

The instruction used for coincidence check will now be described. The ucsti #Imm, Agi instruction, where #Imm represents immediate data such as class number (#class-no) and frame number (#Fr-no) and AGi represents the first and second registers, substitutes the frame number into the AGi and then ends if the contents of the register AGi is "−1" as indicated at 10-3 but unless "−1", reads the contents (SP) on the stack when #Imm does not coincide with AGi and performs branching to the read-out address (PC ← (SP)). In case where the class name and frame name are described in the rule condition part, by substituting the frame number into the corresponding register AGi and thereafter performing branching to the slot instruction code, the ucsti instruction can decide whether a frame in question is of the frame number and if non-coincidence occurs, this instruction can execute another slot instruction code by referring to the FCB on the stack. In case where the frame to be referred to by the rule condition part is given in the form of a variable, by substituting "−1" into the AGi at the rule condition part and thereafter executing the slot instruction code, the ucsti instruction can be used to substitute a name of a frame in question into the AGi and thereafter the ret instruction can be used to perform return to the rule condition part.

As is clear from the above, when used in combination with the FCB, the ucsti instruction can retrieve the frame to be referred to by the rule condition part and when used in combination with the ret instruction, the ucsti instruction can perform return to the rule condition part.

Figure 10:
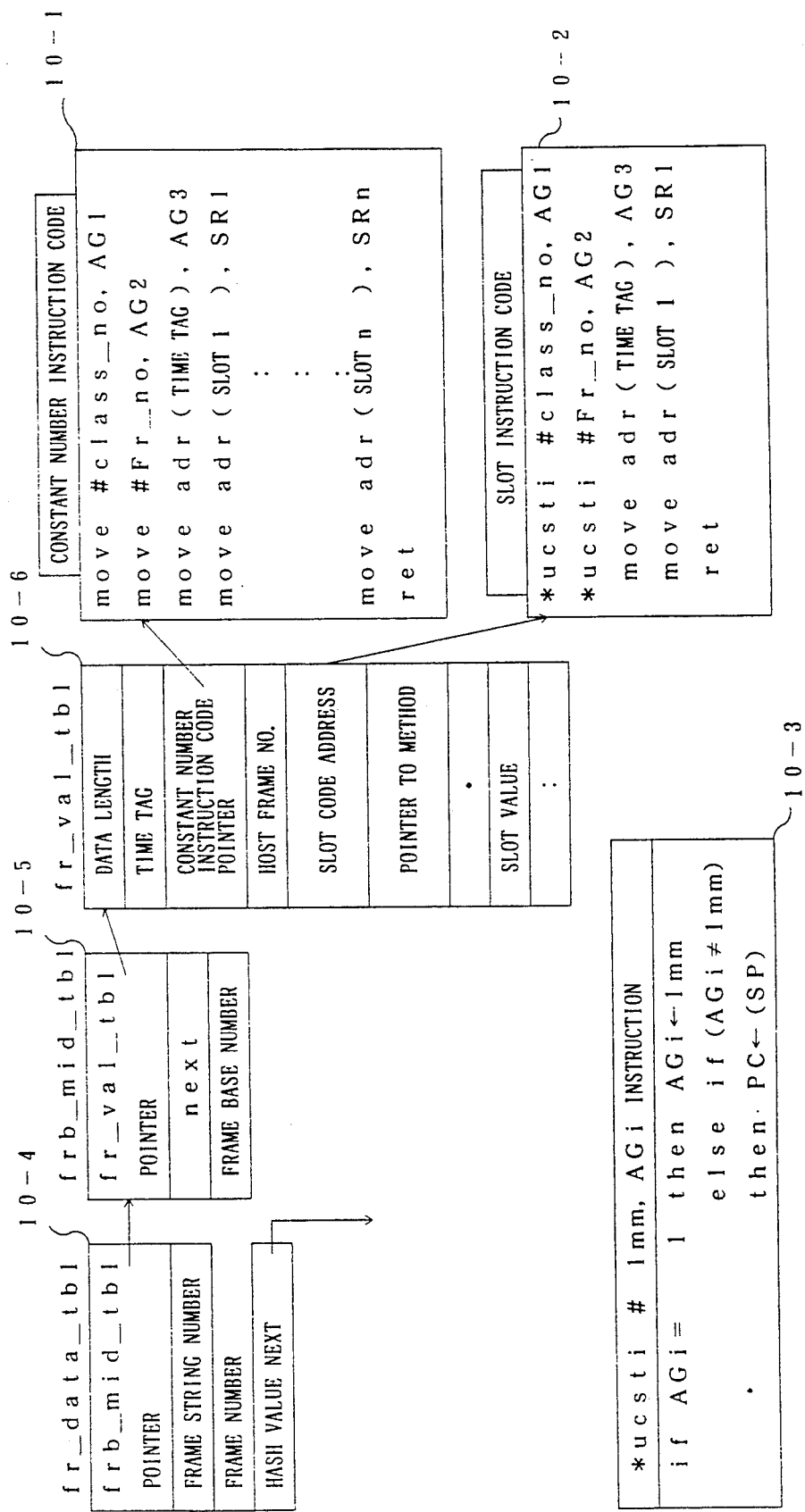
FIG. 10 is a diagram showing the structure of fr-data-$tb_1$, frb-mid-$tb_1$ and fr-val-$tb_1$ tables which are used for conserving frame information, the construction of a constant number instruction code, the construction of a slot instruction code and a flow chart of an ucsti, #Imm and AGi instruction used in the embodiment.

In FIG. 10, fr-data-tb$_1$ (10-4) and frb-mid-tb$_1$ (10-5) are tables used for generation of instruction codes and not related directly to the present invention but a table denoted by fr-val-tb$_1$ (10-6) is adapted to store various kinds of information concerning the frame such as time tag, constant number instruction code address, host class number, slot instruction code address and slot value. The constant number instruction code and slot instruction code make direct reference to the time tag and slot value in the table by using their addresses.

The third means will now be described which is constructed of a scheme in which while an address of a slot instruction code is held on a stack, other slot instruction codes are retrieved sequentially and a scheme in which while an address of a rule condition part instruction code (FIG. 8) is held on the stack, other rule condition part instruction codes are executed sequentially.

Figure 11:
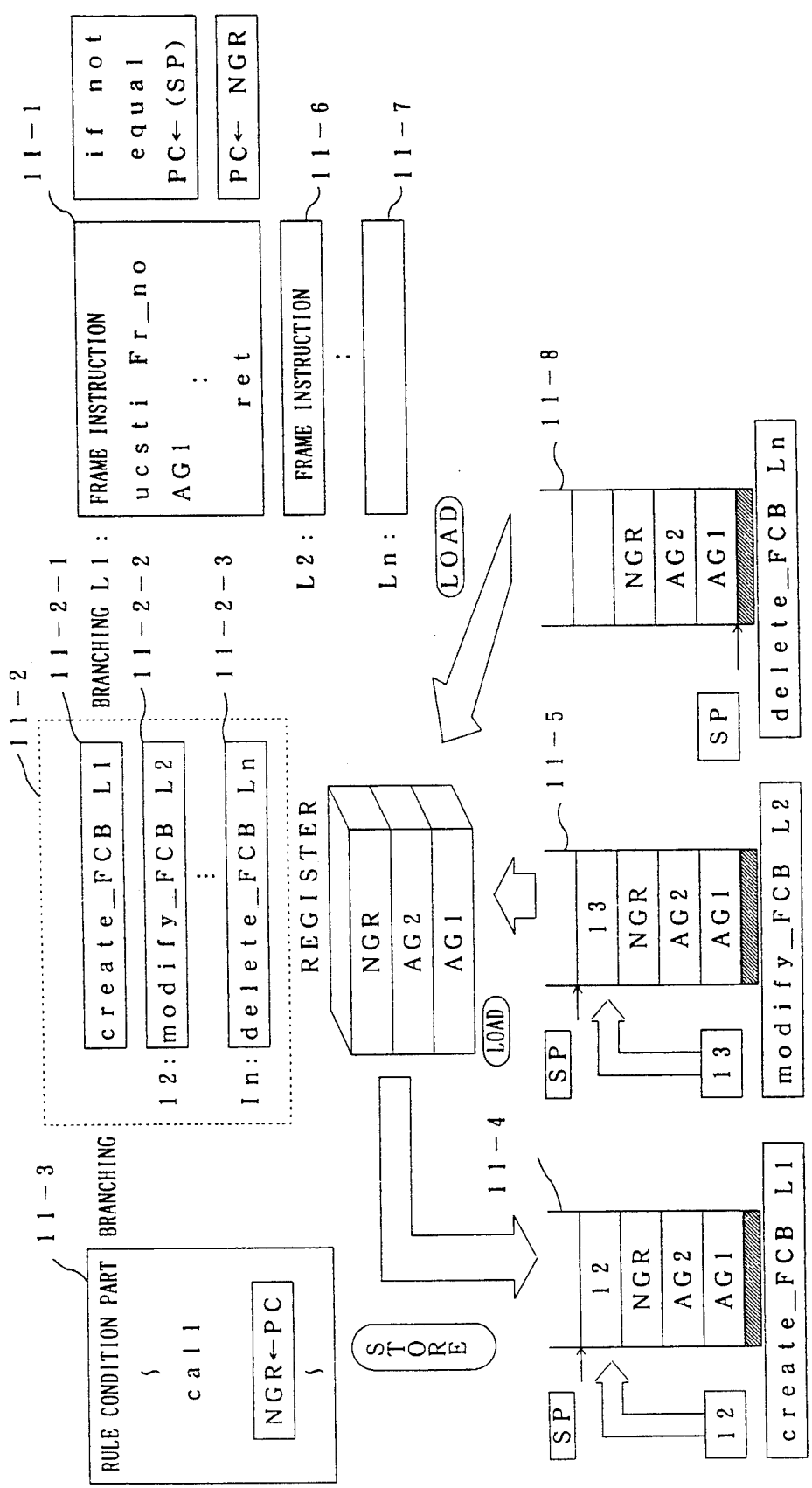
FIG. 11 is a diagram useful to explain the operation of create-FCB, modify-FCB and delete FCB instructions which are called out of a rule condition part instruction code to implement retrieval of a conflict set of a frame instruction code and to explain creation, modification and deletion of the FCB on a stack.

This means may be realized with the rule control instructions for creation, modification and deletion of the FCB and RCB and the frame control instructions which are described previously. Referring to FIG. 11, a frame control instruction 11-2 is used to retrieve frame slot instruction codes 11-1, 11-6, . . . , 11-7 sequentially to achieve conflict set retrieval and this instruction will first be described. More particularly, when a rule condition part 11-3 calls a frame, the slot instruction codes 11-1, 11-6, . . . , 11-7 are not caused directly by a call instruction to branch but branching is done to a frame control instruction 11-2-1 "create-FCB L1" for sequential retrieval and control of the slot instruction codes, and branching from this instruction set to the destined first frame instruction or slot instruction code 11-1 is then performed. In this scheme, the call instruction 11-3 first causes a return address to be held in the NGR register and thereafter branching to the create-FCB L1 instruction 11-2-1 is done which creates a FCB 11-4 on a stack in the memory. In particular, four kinds of information consisting of the contents of the first register AG1, the contents of the second register AG2, the contents of the NGR register and an address 12 of the succeeding instruction, i.e., a "modify-FCB L2" instruction 11-2-2 are stored on the stack and after modification of a stack pointer SP, branching is performed to the first frame instruction (slot instruction code) 11-1 designated by the address L1. As a result, return to the rule condition part after execution of the first slot instruction code can be implemented by branching to an address designated by the NGR register under the direction of the ret instruction (see FIG. 10) in the slot instruction code. On the other hand, when the unification or pattern matching under the direction of the ucsti instruction of the slot instruction code fails, the "succeeding frame control instruction address 12" in the FCB, which is held on the stack by the ucsti instruction, is read out in order to retrieve the second slot instruction code and then branching is done, so that the frame control instruction "modify-FCB L2" 11-2-2 can be executed. Under the direction of this instruction, AG1 of a FCB 11-5 on a stack is loaded on a register AG1, AG2 of the FCB is loaded on a register AG2, NGR of the FCB is loaded on a register NGR and finally, an address l3 of the succeeding instruction is written in the FCB 11-5, followed by branching to an address designated by L2. As a result, the second frame instruction (slot instruction code) 11-6 is permitted to be executed. In this manner, by using the FCB, the frame control instruction and slot instruction code can be retrieved and executed sequentially. When executing the final slot instruction code 11-7, a "delete-FCB Ln" instruction 11-2-3 is used as frame control instruction, as shown in FIG. 11. Under the direction of this instruction, AG1 in a FCB 11-8 on a stack is loaded on the register AG1, AG2 in the FCB 11-8 is loaded on the register AG2 and NGR in the FCB 11-8 is loaded on the register NGR and thereafter a stack pointer SP is modified to delete the FCB and branching to an address Ln is done. This ensures deletion of the unnecessary FCB to improve memory efficiency and permits accessing the FCB created previously.

In this manner, the return control based on the three kinds of frame control instructions create-FCB, modify-FCB and delete-FCB, the frame control FCB and the register NGR can permit the rule condition part to refer to all attribute values of the frame, which are to be referred to, by way of the slot register.

To sum up the frame controlling, it is featured in that highly efficient return control can be realized wherein the rule condition part holds the succeeding instruction address in the register NGR under the direction of the call instruction and thereafter executes the frame slot instruction code, and return to the rule condition part is effected under the direction of the ret instruction, and that the frame retrieval can be realized through repetition of the creation, modification and deletion of the FCB by using in combination the create-FCB, modify-FCB and delete-FCB instructions, the frame control FCB and the ucsti instruction which is adapted to decide whether the frame is to be referred to by the rule condition part.

Figure 12:
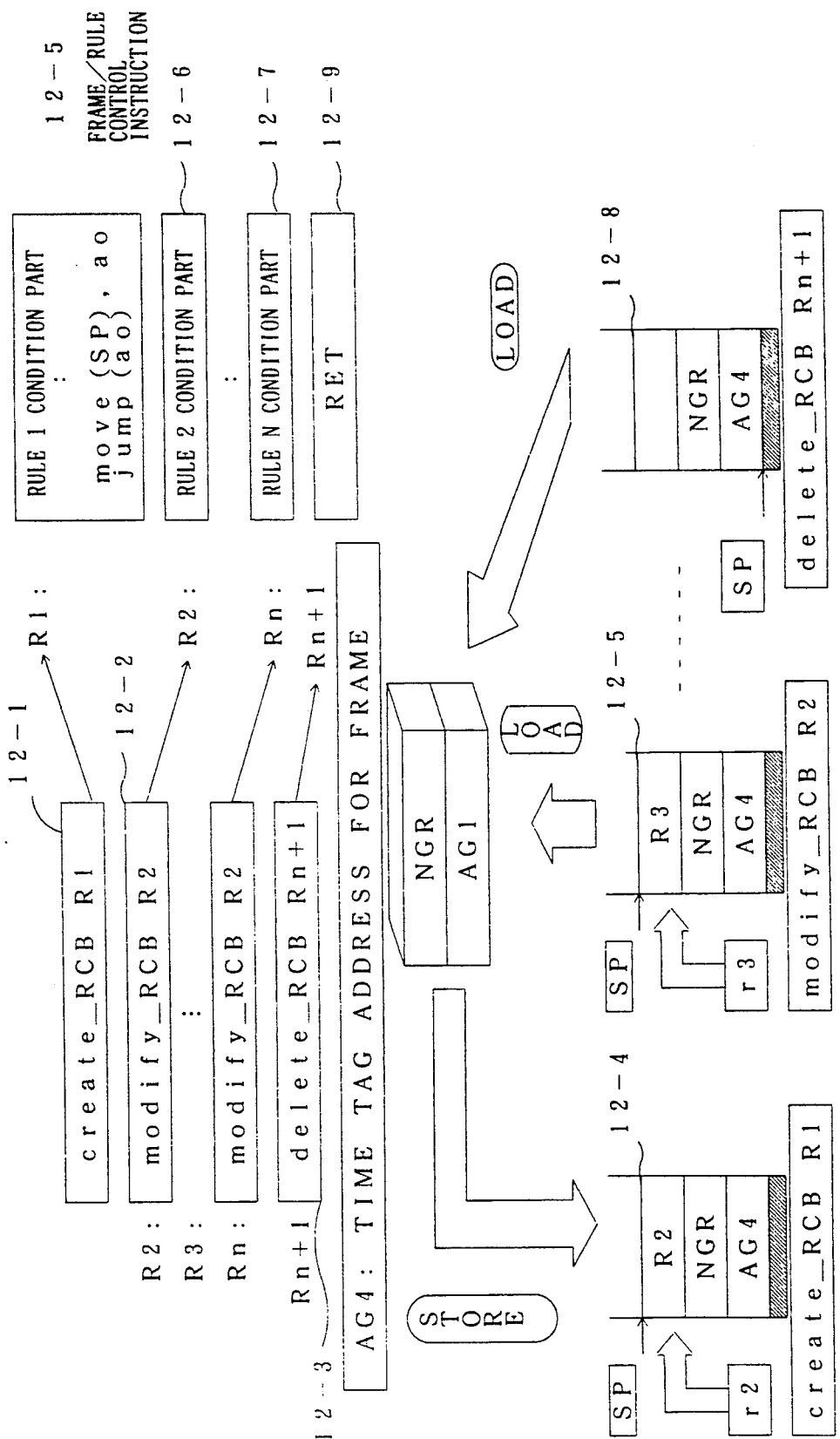
FIG. 12 is a diagram useful to explain the operation of create-RCB, modify-RCB and delete-RCB instructions used for creation, modification and deletion of RCB and to explain the operation of the RCB.

On the other hand, the forward inference thinks much of a mechanism wherein rule instruction sets having condition parts which refer to modified frames are executed sequentially. As in the case of the frame retrieval, this mechanism can also be implemented through execution by repeating the creation, modification and deletion of an RCB (rule control block) on a stack. FIG. 12 shows conflict set retrieval based on rule control. Rule instruction sets having rule execution parts which refer to modified frames are all executed through instructions create-RCB 12-1, modify-RCB 12-2 and delete-RCB 12-3.

Firstly, when the create-RCB R1 instruction 12-1 is executed, an RCB 12-4 is created on a stack, having a fourth register AG4 for holding a constant number instruction code address of a frame modified by the rule execution part, the contents of register NGR and the succeeding instruction address r2, and after modification of a stack pointer SP, branching to an address R1 is done. As a result, a condition part instruction code of rule 1 is executed and finally, "move (SP), a0" and "jump (a0)" in a frame/rule control instruction 12-5 are executed. The two instructions signify that the "succeeding rule control instruction address r2" in the RCB 12-4 on the stack is read out and branching to the address r2 is done but if the previously-described FCB exists on the stack, also signify that the RCB is not permitted to be read before the FCB is deleted by the delete-FCB instruction. More particularly, all of slot instruction codes to be referred to in the condition part instruction code of the rule 1 are caused to branch to the address r2 after execution of retrieval. By this, the conflict set retrieval can be implemented. On the other hand, when an FCB does not exist on the stack but an RCB exists, the modify-RCB R2 instruction 12-2 at the address r2 is executed. Under the direction of this instruction, AG4 in the RCB 12-5 is loaded on register AG4, NGR is loaded on register NGR and finally, the succeeding instruction address r3 is written in the RCB and thereafter branching to address R2 is done. As a result, a rule 2 condition part instruction code 12-6 can be executed. In this manner, through the creation and modification of the RCB, the rule condition part instruction codes can be executed sequentially. When executing the final rule n condition part instruction code 12-7, the delete-RCB $\overline{R}_{n+1}$ instruction 12-3 is used. Under the direction of this instruction, AG4 in an RCB 12-8 on a stack is loaded on the register AG4 and NGR is loaded on the register NGR and thereafter a stack pointer SP is modified to delete the RCB and branching to an address $R_{n+1}$ is done. This ensures that the unnecessary RCB can be deleted and branching to the address designated by the NGR can be done under the direction of the ret instruction 12-9, thereby improving memory efficiency.

To sum up the above rule controlling, it is featured in that retrieval/execution of all of the rule condition parts can be achieved using the instructions "create-RCB" 12-1, "modify-RCB" 12-2 and "delete-RCB" 12-3 and the frame/rule control instruction 12-5 in the rule condition part in combination, and that all of the frames and rules can be retrieved by creating the FCB and RCB on the stacks.

Figure 1:
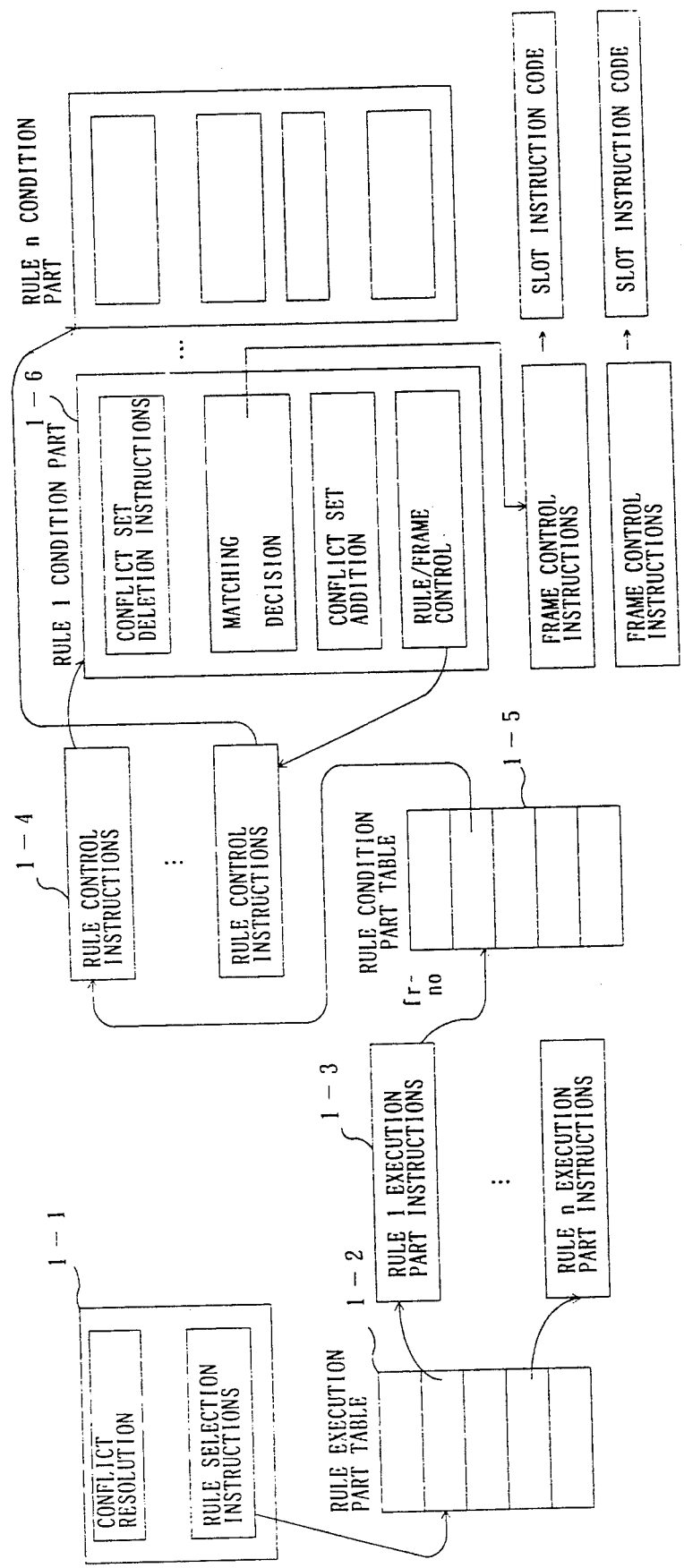
FIG. 1 is a block diagram illustrating the overall construction of an inference system according to an embodiment of the invention.
Figure 2:
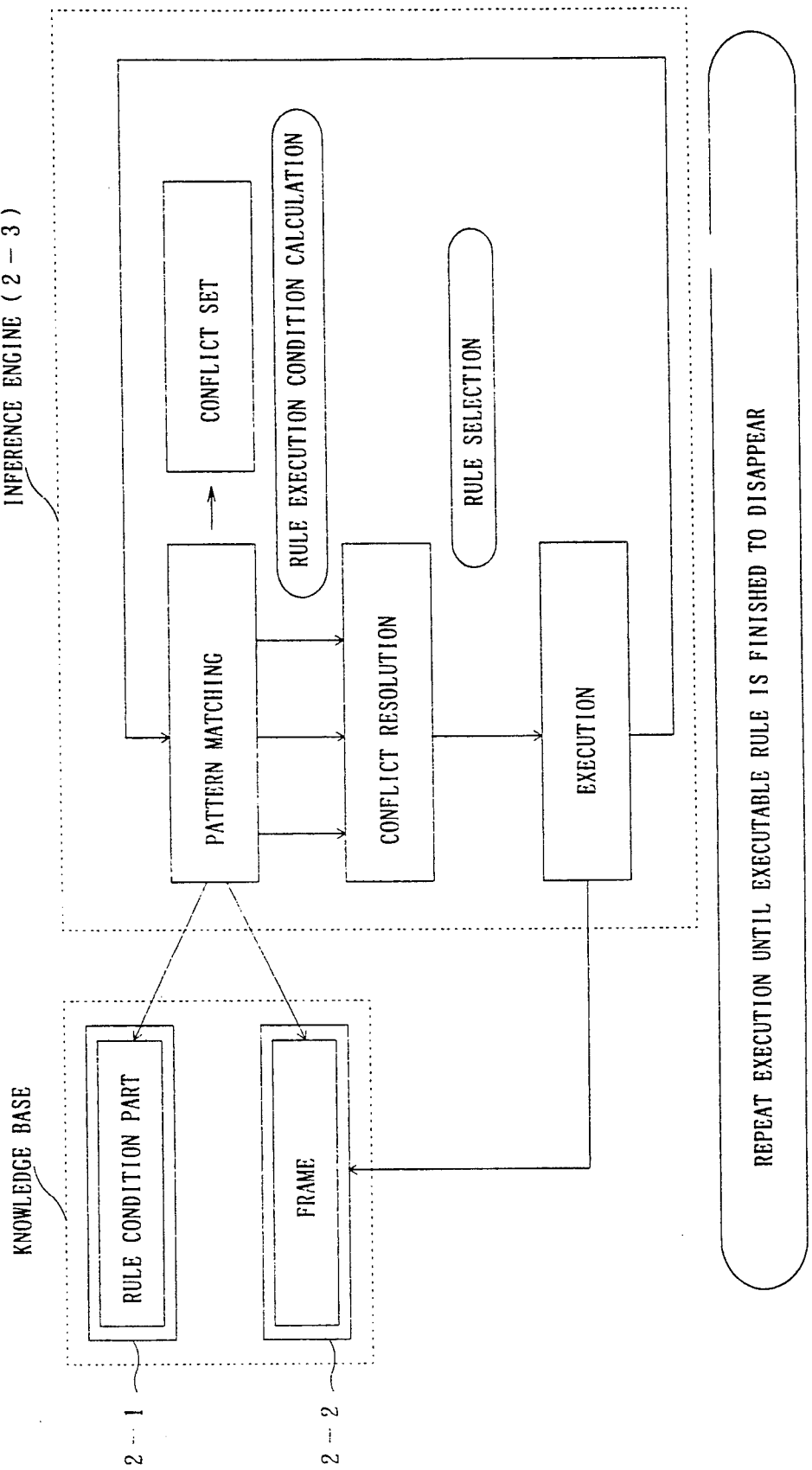
FIG. 2 is a block diagram illustrating the overall construction of an inference engine.
Figure 3:
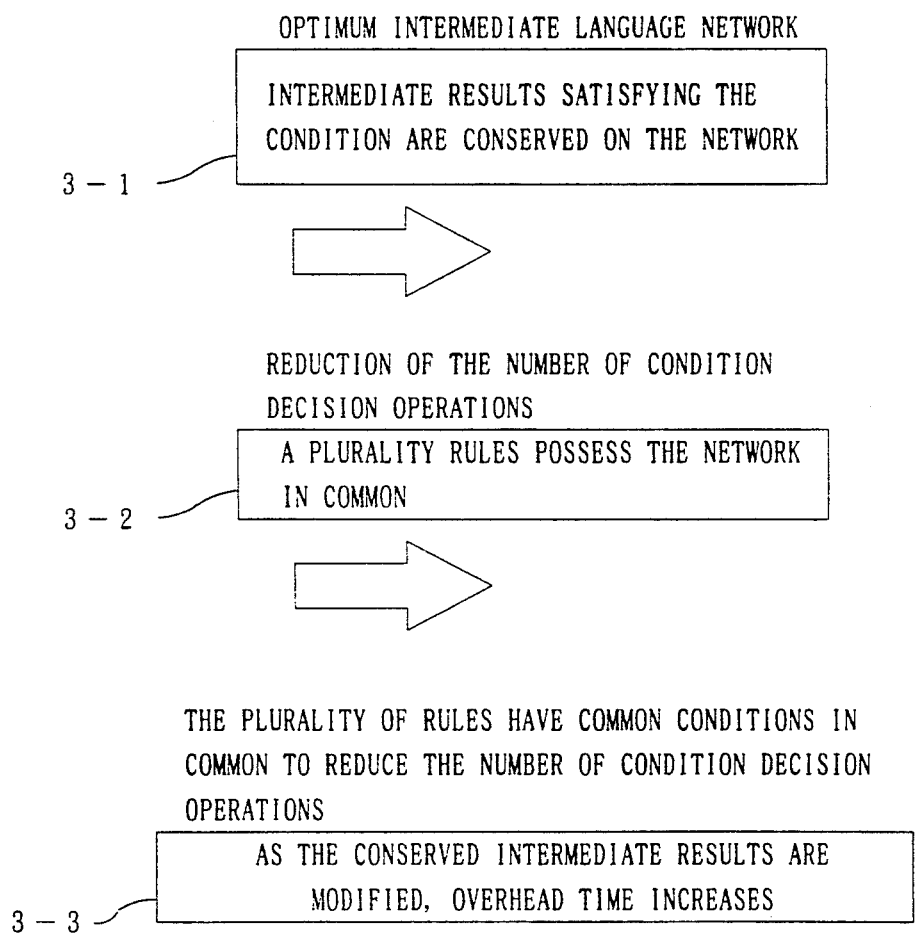
FIG. 3 shows results of analysis of problems residing in the RETE algorithm.

FIG. 1 illustrates the overall construction of an inference system for implementing the conflict set retrieval in forward inference by converting rules and frames into machine language instructions set forth thus far. The inference is carried out by repeating processings of conflict resolution, rule execution and pattern matching as shown in FIG. 2. A conflict resolution instructions 1-1 shown in FIG. 1 refers to the FIG. 9 conflict set table for individual rules to determine a rule to be executed on the basis of one of conflict resolution strategies such as selection of a rule which is valid under the latest time tag and selection of a rule having the maximum number of combinations of time tags (that is, the maximum number of conditions). For example, when a rule which is valid under the latest time tag is desired to be selected, time tag values of time tag pointers in the conflict set table shown in FIG. 9 are compared with each other to determine the rule. Then, on the basis of a rule number to be executed and pursuant to a rule execution part table 1-2 shown in FIG. 1, a machine language instructions address of a rule execution part and an executable condition address in a selected conflict set are substituted into a register AG5 and determined and thereafter branching to a machine language instructions 1-3 in the rule execution part is performed. At that time, a return address is substituted into a register NGR. The rule execution part instructions 1-3 to be executed in this manner can modify the slot value of a frame (Fr-no) designated by the execution part by referring to a value of a variable appearing in the rule execution part, through the medium of the register AG5. It will be appreciated that since the number of variables can be known in advance during compiling, an instruction under the direction of which the variable value is referred to through the register AG5 during rule execution part instruction code creation can be generated. Further, in the rule execution part instructions, upon modification of a frame, the time tag value of the frame shown in FIG. 10 is modified to the latest value and the corresponding time tag address is substituted into the register AG3, and at the same time a pointer for a constant number instruction code of the frame is determined from the table fr-val-tb$_1$ shown in FIG. 10 and substituted into the register AG4 and thereafter the contents of entry designated by Fr-no in a rule condition part table 1-5 is read out and branching to the readout address is done. The above is the rule execution part processing. Subsequently, branching to rule control instructions 1-4 is done and the rule control instructions 1-4 are executed to execute a rule condition part instruction code 1-6 in order to perform the pattern matching processing as described previously. However, the final rule control instruction to be executed (12-3 in FIG. 12) is a delete-RCB $R_{n+1}$ instruction and the ret instruction (12-9 in FIG. 12) is necessarily placed at the address $R_{n+1}$. This ensures that after all of rules having condition parts which refer to the modified frame Fr-no are executed, return to the conflict resolution instructions can be performed under the direction of the ret instruction, thus making it possible to again perform conflict resolution so that the above conflict resolution, rule execution and pattern matching processing are repeatedly executed until executable conditions are all finished to disappear.

The first means for compile type execution and the third means or conflict set retrieval means for making a matching decision between all rules and all frames with high efficiency have been described.

The second means will now be described which limits the number of rules to be executed and of frames to be referred to by using a hash table to reduce the number of matching decision operations.

Figure 13:
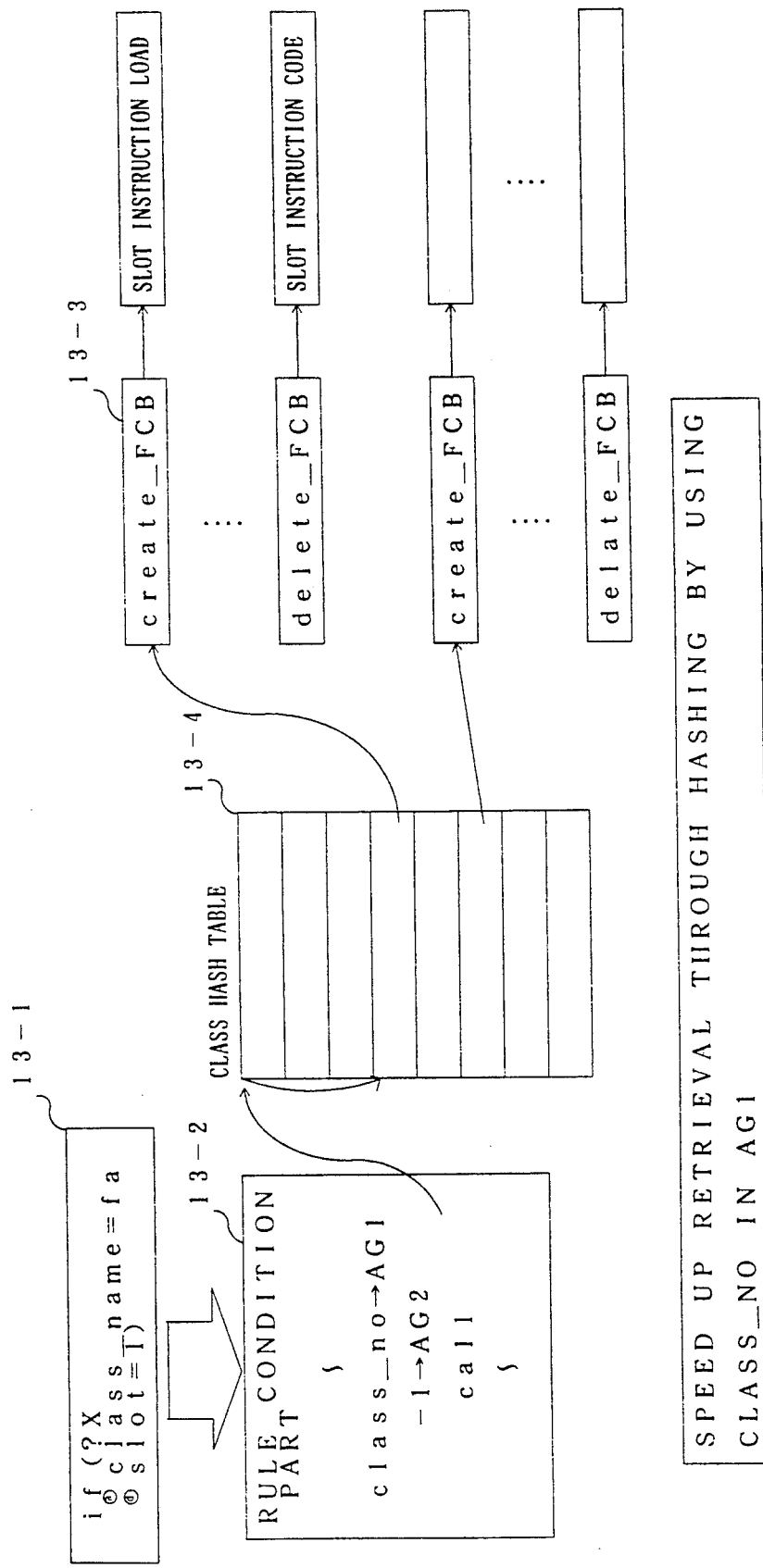
FIG. 13 is a diagram showing the construction of a class hash table associated with individual slots which is introduced for limiting, as possible, the number of frames to be referred to by the rule condition part, FIG. 13 being useful to explain the operation of the class hash table.

Firstly, a scheme for speed-up of frame reference based on hash will be described with reference to FIG. 13. In case where all frames are handled having class name fa and slot name slot as frame conditions to be referred to by a rule condition part 13-1 as shown in FIG. 13, the above scheme using the aforementioned means is implemented in such a manner that in a rule condition part instruction code 13-2, the class name fa (class-no in FIG. 13) is loaded on the register AG1, a flag "−1" indicating that the frame name is variable is loaded on the register AG2 and thereafter branching to a frame control instructions 13-3 is performed, as shown in FIG. 13. However, due to the fact that the frames to be referred to can be limited to those having the slot name called slot and the class name called fa, the retrieval range can be limited greatly by preparing hash tables 13-4 associated with individual slots and having entry numbers in the form of class-no prepared during compiling. In case where the number of frames to be referred to by the rule condition part is constant, branching may be done directly to the slot instruction code and no problem arises. On the other hand, where one of the class and frame names or the slot name alone is designated by the rule condition part, all of slot instruction codes referred to by the class hash table 13-4 associated with the slot have to be retrieved sequentially and this retrieval can be implemented using the frame control instruction.

Figure 14:
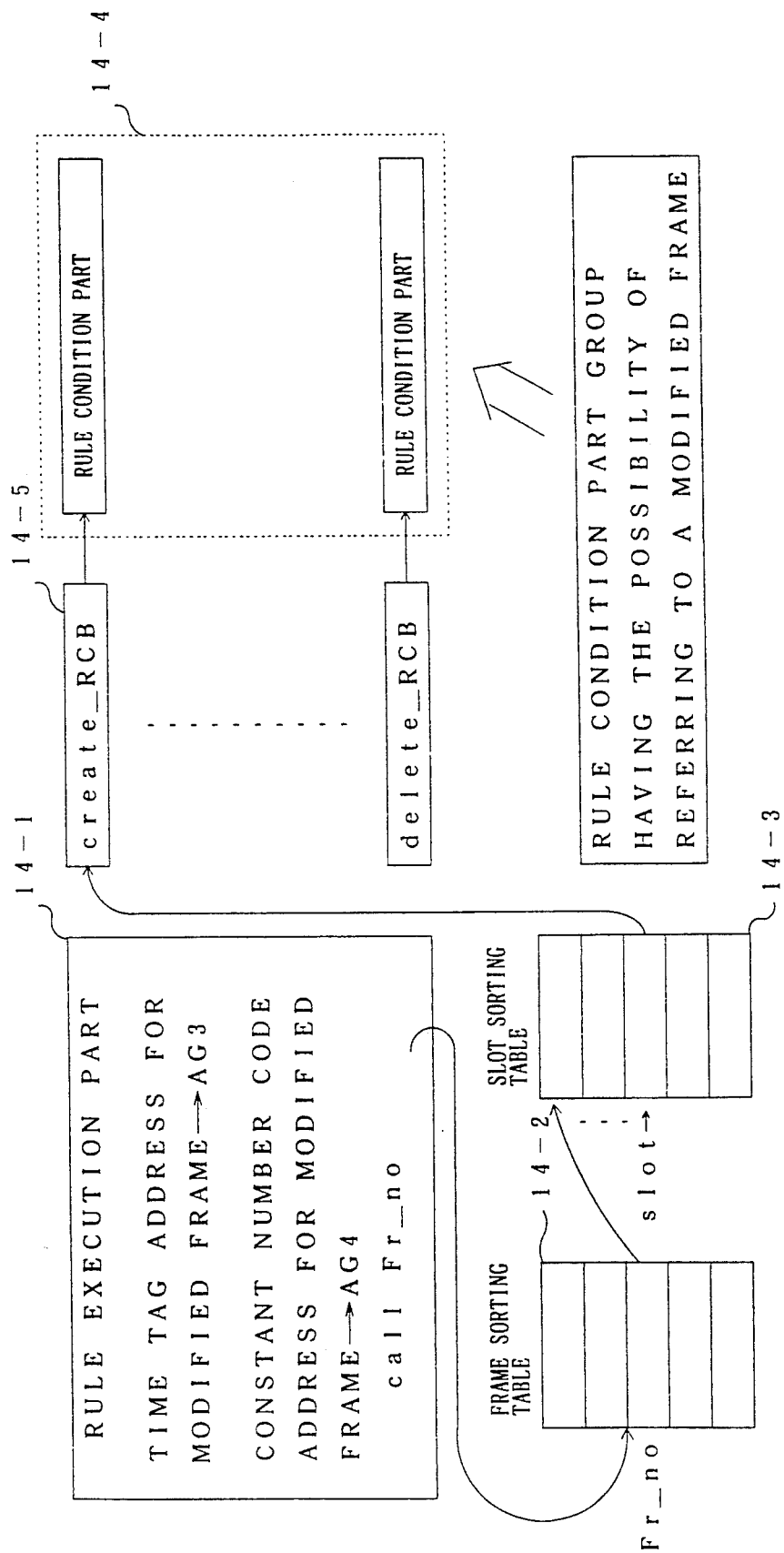
FIG. 14 shows a frame sorting table and a slot sorting table which are introduced for limiting, as possible, execution of an instruction code of the condition part which refers to a frame modified by a rule execution part.

Referring now to FIG. 14, a scheme for limiting the number of rules to be executed will be described. In this scheme, when the slot value of a frame is modified at a rule execution part 14-1, a time tag address and a constant number instruction code address of the modified frame are substituted into the registers AG3 and AG4 (third and fourth registers), respectively, an address of a slot sorting table 14-3 is then determined from a frame number and a frame sorting table 14-2 of that frame, and thereafter an address of a rule control instruction 14-5 for a rule condition part instruction code group 14-4 to be executed is determined from the slot sorting table and the modified slot name (slot). By making reference to the above two tables, only a rule group having condition parts which refer to the modified slot name of that frame is permitted to be executed and the number of rules can be limited greatly.

As described above, by limiting the number of frames and rules, the number of frames to be referred to and of rules to be executed can be limited greatly.

Figure 15:
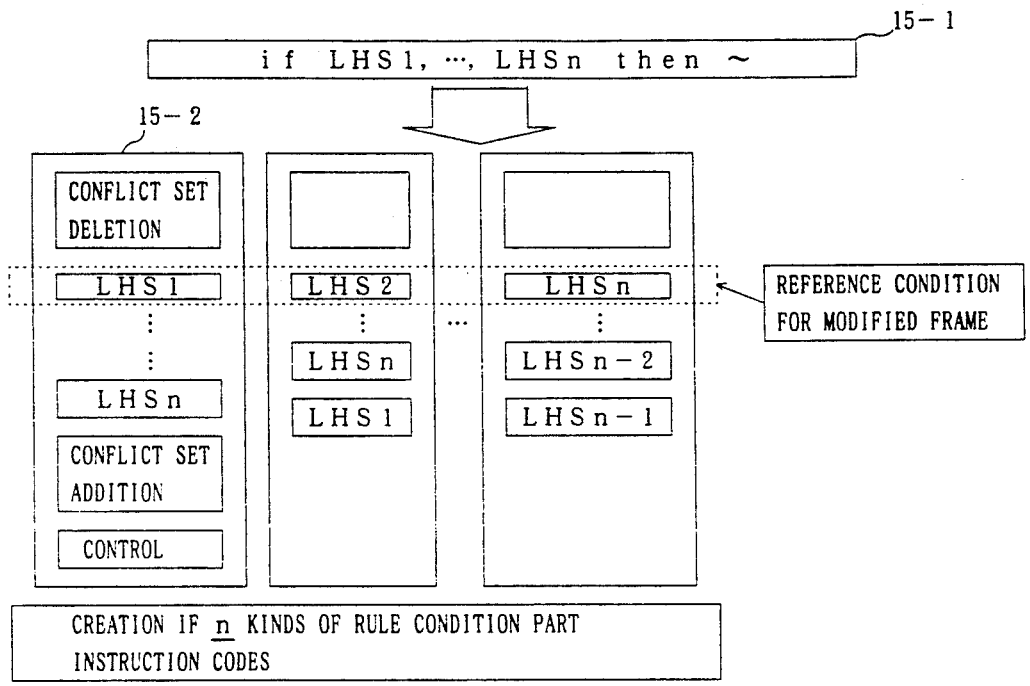
FIG. 15 is a diagram showing an example of expression of an instruction set in the rule condition part.

Finally, the kind of rule condition part instruction code will be described. FIG. 15 illustrates a rule condition part instruction code 15-2 required for a rule 15-1 having n conditions LHS1 to LHSn. Here, LHS is abbreviation of Left Hand Side implying a condition. Fundamentally, in this scheme, conflict sets for all rules are prepared immediately before the commencement of execution of inference as in the case of the RETE and therefore the rule condition part instruction code 15-2 is required to have two functions of generating all conflict sets and inhibiting execution of a condition which does not refer to a modified frame. Accordingly, in order to comply with the case where any condition is modified, n instruction codes are prepared in association with respective conditions as shown in FIG. 15. This increases the instruction code size but conveniently can inhibit execution of a condition not referring to a modified frame to speed up the processing.

Figure 16:
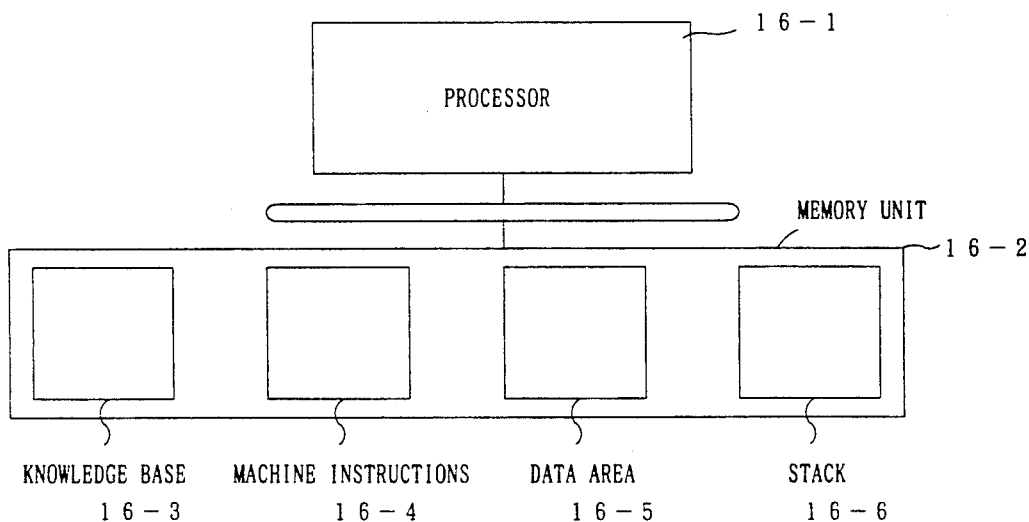
FIG. 16 is a diagram showing the construction of a computer and a memory unit used in the embodiment.

The first to third means of the present invention have been described so far. These means will now be described in greater detail by way of example. Referring to FIG. 16, the present invention may be implemented using a processor (computer) 16-1 and a memory unit 16-2 including a knowledge base 16-3, a machine language instruction set 16-4 resulting from conversion of the knowledge base, a data area 16-5 used by the machine language instructions and a stack 16-6 used during execution of machine language instructions. The data area 16-5 is comprised of a conflict set control table (FIG. 9), a conflict set table (FIG. 9), a table fr-val-tb$_1$ (FIG. 10), a class hash table (FIG. 13) associated with individual slots, a frame sorting table (FIG. 14), a slot sorting table (FIG. 14), a rule execution part table (FIG. 1) and a rule condition part table (FIG. 1). The stack is used for dynamically creating, modifying and deleting the previously-described FCB and RCB. Used as the computer is a general-purpose computer such as E-7300 manufactured by Hitachi, Ltd. employing MPU (microcomputer) MC 68020 manufactured by Motorola Inc. Therefore, machine language instructions pursuant to the Motorola MC 68020 instruction manual will be used in the following description without giving their descriptions (For more information, see the manual).

The point of the present invention resides in which machine language instructions is used for realizing rules and facts in the knowledge base and has been detailed so far. Accordingly, a supplemental explanation of the point will mainly be given hereinafter.

Firstly, the manner of practicing the frame control instruction set and the rule control instruction set will be described with reference to FIG. 17. Based on MC 68020 instructions, a create-FCB L1 instruction may be practiced using four instructions as shown. Since under the direction of a jsr L1 instruction the succeeding address is stored in a stack and branching to L1 is performed, a FCB as shown in FIG. 6 may be created. Here, AG1 may be held in a data register D1, AG2 in a register D2 and NGR in a register D0. In a modify-FCB L2 instruction 17-2, an adda #12, SP instruction is needed for modifying a stack pointer SP to cause the same to designate the base of the FCB and other instructions are load instructions for loading onto registers in contrast to the instructions in the create-FCB instruction. A delete-FCB L3 instruction 17-3 also contains an instruction set under the direction of which the contents of the FCB on the stack is read and thereafter the FCB is deleted and branching to address L3 is done as described previously. On the other hand, create-RCB L1, modify-RCB R2 and delete-RCB R3 instructions 17-4, 17-5 and 17-6 function as described hereinbefore.

In this manner, each of the instructions for creation, modification and deletion of the FCB and RCB may be practiced simply by using only 4 to 5 instructions.

The manner of practicing an ucsti #Imm, AGi instruction 18-1 appearing in the slot instruction code will now be described with reference to FIG. 18. If a register AGi is "−1", this instruction ends after substituting immediate data #Imm into the Agi. However, unless the contents of the AGi is "−1", the contents of the AGi is compared with #Imm under the direction of the instruction 18-1. If coincidence occurs, this instruction ends but if non-coincidence occurs, the contents on the stack is substituted into a register ao and then branching to the address of the register ao is done. As described previously, this ensures that the frame control instruction can be executed when the FCB exists on the stack and on the other hand the rule control instruction can be executed when the RCB exists on the stack, thereby implementing conflict set retrieval of frames and rules.

In this manner, the ucsti instruction can also be practiced simply by using 7 instructions.

Referring to FIG. 19, a simplified example of a knowledge base will now be described where the knowledge base consists simply of one rule and two frames and practiced with machine language instructions. A frame fa 19-1 is a class frame and belongs to a super class which is the highest host system. The frame fa possesses two kinds of attributes, that is, an attribute b having an initial value of "0" and an attribute c having an initial value of "1". A frame $fa_1$ 19-2 is an instance frame belonging to the class fa and like the fa, possesses attributes b and c having initial values "0" and "1", respectively. On the other hand, a rule ra 19-3 signifies that if in its condition part the frame name is given by a variable X, the class frame name is fa, the value of an attribute c is "1" and an attribute b satisfies a condition of being less than 4, then in its execution part following "then" an attribute b of a frame designated by the variable X shall be added with "1" and the resulting value shall be substituted into the attribute b. The frame name is given by the variable X and therefore a plurality of frames are in general applied frequently. But in this bench mark production the instance frame having the class frame name fa is $fa_1$ alone and hence only one rule executable condition is generated as a conflict set consisting of a time tag storage address for the $fa_1$ and the value of variable X (or $fa_1$). As will be seen from the above, when inference is initiated in this program, the attribute b of the $fa_1$ is added with "1" so that the rule $r_a$ is executed four times. A rule executable condition is deleted when a rule is executed once under the rule executable condition to thereby create a new rule executable condition and this process is repeated four times. The knowledge base is converted into machine language instructions and executed in accordance with teachings of the invention as will be described in greater detail by way of example with reference to a register allotment table of FIG. 20, diagrams of FIGS. 21 to 24 and machine language instructions shown in FIGS. 25 to 36.

FIG. 20 shows a table 20-1 of correspondence between the register name and the contents of register in this example. In connection with the machine language instructions for frame, the first register AG1 for holding a class frame number is made to correspond to d0, the second register AG2 for holding a frame number Fr-no in question is made to correspond to d1, the third register AG3 for holding a time tag address indicative of freshness in terms of time of a rule in question is made to correspond to a2, the slot register SR for holding a storage address of the value of slot b is made to correspond to d2 and the slot register SR for holding a storage address of the value of slot c is made to correspond to d3. On the other hand, the register NGR for holding addresses during rule execution and frame call is made to correspond to d7, the register for holding a time tag address of a modified frame set by the rule execution part and referred to by the rule condition part instruction code is made to correspond to a3 and the fourth register for holding a constant number instruction code address of the modified frame is made to correspond to a4. Essentially, the above correspondence relation defines an interface stipulation used to speed up the reference operation but the registers may also be used as work registers.

FIG. 21 shows a table cs-max-$tb_1$ 21-1 for holding, in respect of each rule, a rule executable condition address having the maximum time tag in the conflict set, a conflict set table exec-cond-$tb_1$ 21-2 (FIG. 9), a conflict set control table rule-cont-$tb_1$ 21-3 (FIG. 9), a program exec-cond-top-Pr 21-4 for holding the head address of the conflict set table, and a table cs-free-$tb_1$ 21-5 for registering a rule executable condition deleted from the conflict set table in order to reuse the same. Firstly, when max-cond in the cs-max-$tb_1$ is "−1", it is indicated that an executable condition for the rule does not exist and when "0", it is indicated that an executable condition for the rule has been deleted during the preceding cycle and a rule executable condition having the maximum time tag must be again determined. When not being "−1", the max-cond implies an address for a rule executable condition having the maximum time tag. When being "−2", the max-cond implies a flag indicative of the end of the cs-max-$tb_1$ table. The contents of the exec-cond-$tb_1$ has been described briefly with reference to FIG. 9 but in this example ELT-CONT is added. When the executable condition is deleted from the conflict set, the ELT-CONT is used as information for holding the size (the sum of the number of time tags and the number of variables) of the deleted executable condition so that this executable condition may be reused to improve memory efficiency. Specifically, upon deletion, the executable condition subject to deletion is registered in the cs-free-tb$_1$ in accordance with the size indicated by the ELT-CONT. Accordingly, when creating a new executable condition, the cs-free-tb$_1$ may be referred to in accordance with the size of the new executable condition and if registration is identified, the corresponding memory area may be reused. The other information has already been explained and will not be described herein. It should be understood that in this example the number of the rule condition is one and the number of the variable appearing in common to the rule condition part and execution part is only one therefore the size of the rule executable condition amounts in total to 28 bytes consisting of 7 pieces of 4-byte information. On the other hand, when exec-cond-Pr in the rule-cont-tb$_1$ is "−1", it is indicated that a rule executable condition does not exist in a rule in question and in other case, the exec-cond-pr implies a rule executable condition address. When being "−1", a free pointer in the cs-free-tb$_1$ implies that a rule executable condition for the size in question does notexist in the cs-free-tb$_1$ and when taking the other value, it implies an address of a rule executable condition which is free.

Figure 22:
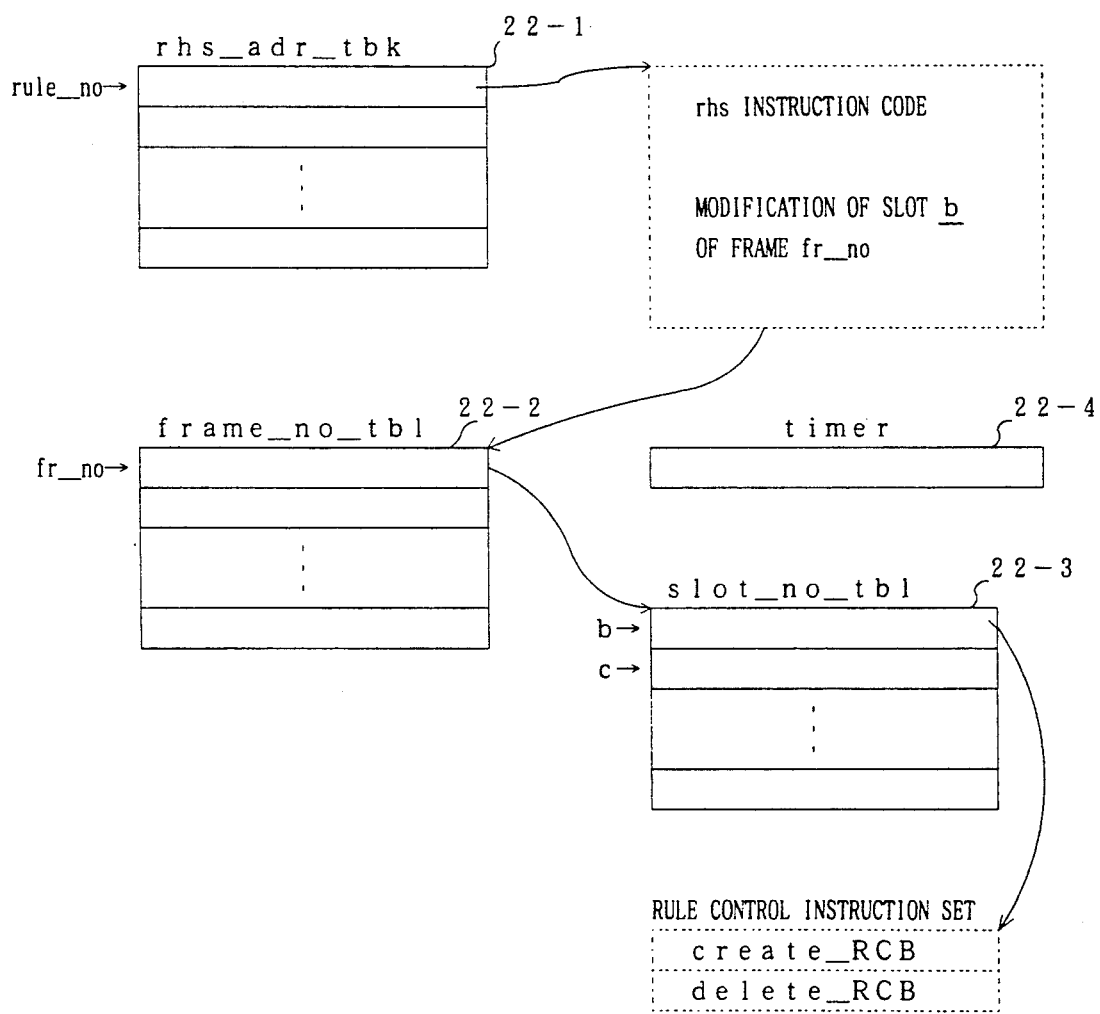
FIG. 22 is a diagram showing the structure of rhs-adr-$tb_1$, frame-no-$tb_1$, timer and slot-no-$tb_1$.

FIG. 22 shows the structural relation between the machine language instructions (dotted-line blocks) and each of the rule execution part table rhs-anr-tb$_1$ 22-1 (FIG. 1), frame sorting table frame-no-tb$_1$ 22-2 (FIG. 4), slot sorting table slot-no-tb$_1$ 22-3 (FIG. 14) and global timer 22-4 used when the frame is modified. Under the direction of the above tables, an address of a rule execution part instruction code (rhs instruction code) to be executed can be determined from the rhs-adr-tb$_1$ by using a rule number rule-no of a rule selected through conflict resolution and then a rule control instruction address can be determined through the frame no-tb$_1$ 22-2 and slot-no-tb$_1$ 22-3 by using a frame number fr-no of a modified frame and a slot number of slot (implying an attribute register number which is slot b in this example).

FIG. 23 shows the relation between the rule condition part instruction code 23-3 executed by the rule control instruction set and individual slot hash tables slot-b-tb$_1$ 23-1 and slot-c-tb$_1$ 23-2 of the frame. Under the direction of a "call fa-b" instruction in the rule condition part instruction code 23-3, a frame control instruction set address 23-4 can be determined from the class hash table slot-b-tb$_1$ 23-1 of slot b and a class frame number fa of fa$_1$ and executed and a slot b instruction code 23-5 of the fa$_1$ can be executed. Similarly, under the direction of a "call fa-c" instruction 23-6, a slot c instruction code 23-7 of the fa$_1$ can be executed. In this example, on the ground that the rule has only one condition, the slot instruction code is executed only once during conflict set initialization effected immediately before the commencement of inference and on the same ground, after the commencement of inference, only a constant number instruction code 23-8 of the frame fa$_1$ is always executed at the rule condition part. As is clear from the above, by preparing the class frame hash tables associated with individual slots, the number of frames to be referred to can be limited.

Figure 24:
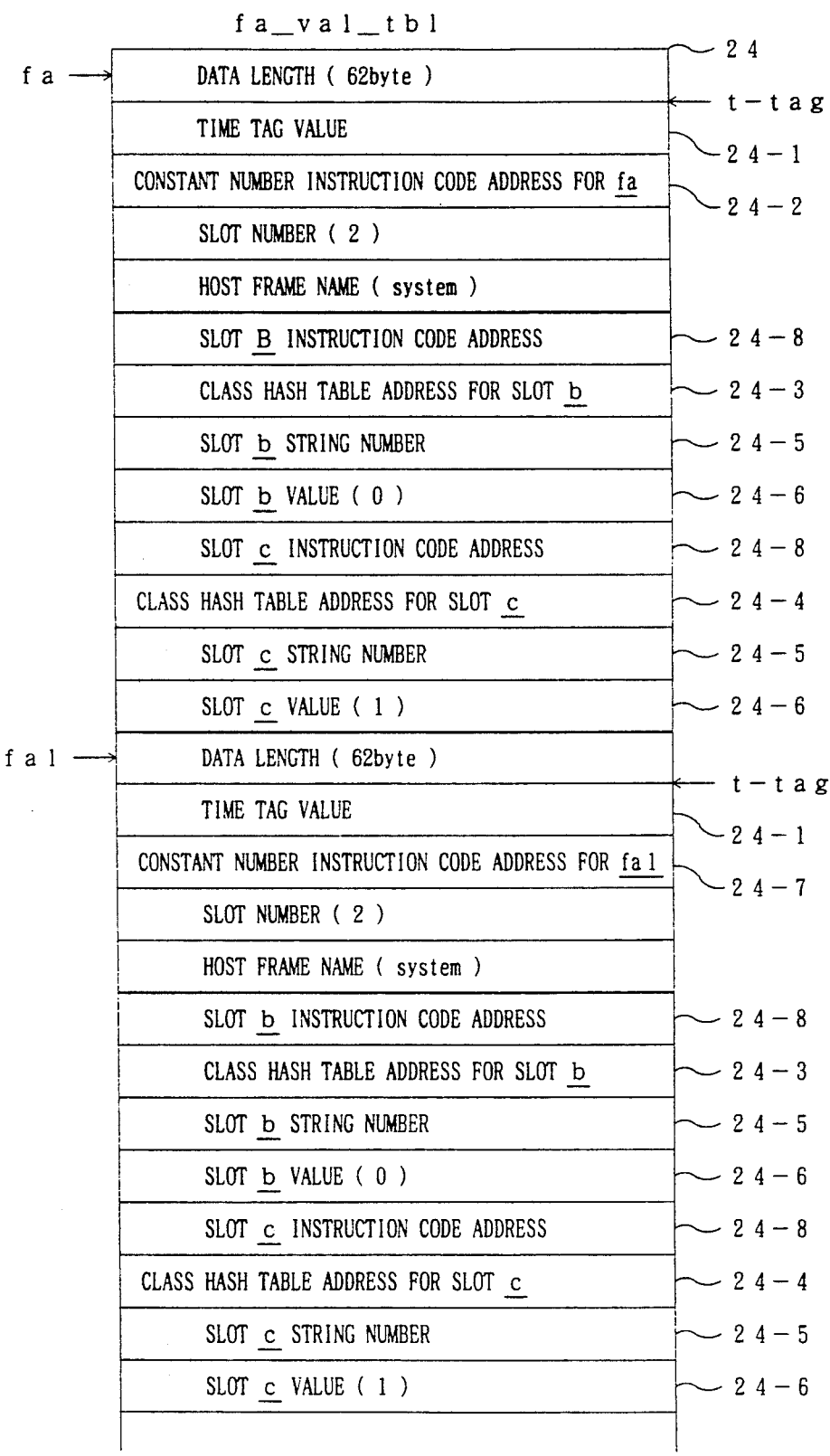
FIG. 24 shows details of the structure of an fr-val-$tb_1$ used in the embodiment.

FIG. 24 shows the structure of the fr-val-tb$_1$ (FIG. 10), as used in this example, in greater detail. The size of each information piece is 4 bytes and each of the $\underline{fa}$ and fa$_1$ has 13 information pieces including a time tag value 24-1 referred to by the frame instruction code, a constant number instruction code address 24-2 of the $\underline{fa}$, a constant number instruction code address 24-7 of the fa$_1$, a slot instruction code address 24-8 for each slot, a class hash table address 24-3 for slot b, a class hash table address 24-4 for slot c, a string number 24-5 of slot name and a slot value 24-6. The table fr-val-tb$_1$ having the above structure serves to hold the substance of the frame. In this table, t-tag indicates a time tag value address for the $\underline{fa}$ and t-tagl indicates a time tag value address for the $\overline{fa}_1$.

FIGS. 25 to 36 show a conflict resolution instruction stream, a rule execution part instruction stream, a rule condition part instruction stream used in pattern matching, a rule control instruction stream, a frame control instruction stream, a constant number instruction code instruction stream of frame and a slot instruction code instruction stream of frame. Under the direction of these instruction streams, the tables shown in FIGS. 21 to 24 are used to convert rules and frames into machine language instructions and execute inference. In FIGS. 25 to 36, "$" represents immediate data and "/*∼*/" represents comment.

An embodiment will now be described wherein the present invention is implemented using the machine language instruction streams shown in FIGS. 25 to 36.

The overall structure will first be described FIGS. 25 to 27 show an instruction set for performing conflict resolution. FIG. 28 shows an instruction stream for performing execution. FIGS. 29 to 33 show instructions for executing pattern matching and FIGS. 34 to 36 show a frame control instruction and a frame instruction code.

The contents of each of the conflict resolution, execution and pattern matching processings will be described in greater detail to demonstrate that the present embodiment operates correctly.

Firstly, the conflict resolution processing will be described. Referring to FIG. 25, there are involved in comment /* execution start */ a mov. 1 LBLO, d$_7$ instruction and a bra INIT instruction, indicated at 25-1, for performing initialization of a conflict set at the commencement of inference execution. Then, operation of the initialization will first be described. After return to register NGR (d$_7$) and setting of address LBLO are effected, branching to INIT is done. The branching destination INIT appears at the beginning of /* matching decision */ shown in FIG. 31 and it is contained in the rule condition part instruction code. The INIT has the previously-described create-RCB instruction and is needed for execution of another existent rule condition part instruction code. Specifically, the a$_4$ holding a constant number code address for a modified frame and the NGR holding a return address are stored in a stack designated by the register SP and finally the succeeding rule control instruction address R$_0$ is stored in AR (FIG. 7) of the RCB to execute continuous address instructions indicated at 31-1. Here, R$_0$ appears in FIG. 33 and forms the head address 33-1 in the delete-RCB instruction. Since the value of the NGR recovers at the delete-RCB and subsequently a $\underline{ret}$ instruction 33-2 for branching to its address is executed, return to a label LBO in FIG. 25 can be done after completion of the conflict set initialization. In FIG. 31, instructions to be described below follow the create-RCB instruction. Reverting to the rule condition part shown in FIG. 19, it will be seen that the frame name referred to in the rule condition part is given by the variable X and the class frame name of a frame in question is given by $\underline{fa}$. Therefore, the succeeding move $fa, do instruction 31-2 substitutes the class frame name $\underline{fa}$ into the first register d0, a flag "−1" indicating that the frame name is the variable is then set in the second register, as indicated at 31-3, and subsequently the d0 holding the slot-c-tb$_1$ shown in FIG. 23 and the class frame name is transferred to the d$_7$, and lower two bits of the d$_7$ are set in the d$_7$ under the direction of an and $ 0X0003, d$_7$ instruction and thereafter two bits shifted to the left under the direction of an lsl, 1 $2, d$_7$ instruction so as to be quadrupled, providing a resulting value which is added to the a0 to thereby determine its address, as indicated at 31-4. Because of the slot-b-tb$_1$ in FIG. 23 having four entries each having 4-byte data, the above processing corresponds to the procedure wherein lower two bits (capable of expressing 0 to 3) of the fa is determined and quadrupled (because of 4 bytes per entry), and a resulting value is added to the a0 to provide an entry address of the fa. Thus, an entry address of the slot-c-tb$_1$ can be determined through hashing and under the direction of the succeeding instruction move a.1 (a0), a0 31-5, a frame control instruction address for the slot c can be determined at the a0. Subsequently, in order to perform such controlling that when branching to an address designated by the a0 is done, the instruction code for the slot c is executed and returned, return address LC is set in the d$_7$ and branching is done under the direction of a jmp (a0) instruction 31-6. Consequently, as will be seen from FIG. 23, an instruction to be executed is the create-FCB instruction standing for a frame control instruction 34-1 for the slot c of the frame fa$_1$ as shown in FIG. 34. Here, the first register d0, second register d1, NGR standing for d$_7$ and the continuous succeeding instruction are stored on a stack and thereafter branching to FAIL is done. Since the FAIL appears in FIG. 33 and substitution of data on the stack into the a0 and branching to its address are done under the direction of the FAIL, return to FIG. 34 occurs and a delete-FCB 34-2 is executed. Then, under the direction of a bra FA1-C instruction, a slot c instruction code 35-1 for fa$_1$ contained in FA1-C shown in FIG. 35 is executed. Since fa is at the d0 and the value "−1" is at the d$_1$, after execution of two ucsti instructions, the d0 remains to be fa but fa$_1$ is substituted into the d1 and a time tag address for the fa$_1$ is substituted into the a2 as will be seen from FIG. 24, so that the address of the slot c can be substituted into the d3 and finally return to the address designated by the NGR i.e., the LC in FIG. 31 can be done. In the LC, a move.1 d3, a0 instruction, a compi.1 $1, (a0) instruction and a bne FAIL instruction, indicated at 31-7, which make decision on the rule condition part, that is, perform "@ c=1", are executed. Since in this example the value of (a0) is "1", branching to the FAIL is not performed and a processing for performing matching decision "@ b<4", which resembles the operation described previously, is executed. Thus, a move.1 d2, a0 instruction, a cmpi.1 $4, (a0) instruction and a bge FAIL instruction, indicated at 31-8 and contained in a label LB in FIG. 31, are executed. Then, since the address of slot b is substituted into the d2 under the direction of a slot b instruction code for fa$_1$ shown in FIG. 35, the (a0) is "0" as will be seen from FIG. 24. Consequently, under the direction of the succeeding instruction bra ADD-CS 31-9, branching to ADD-CS is done. To sum up, the fa$_1$ is substituted into the register d1 for holding the frame name to correspond to the value of the variable X and on the other hand the time tag address for fa$_1$ is held in the a2. Consequently, in the conflict set addition processing performed at ADD-CS, the rule executable condition can be prepared on the basis of the two pieces of information.

The ADD-CS appears in FIG. 32. In the first processing, it is examined whether the time tag address and the executable condition for size 2 of the variable X are registered in the cs-free-tb$_1$. Here, because of a compi.1 $-1, (a0) instruction 32-1, execution start and registration are negated, with the result that under the direction of the succeeding bne FR1 instruction 32-2, a movea.1 $ exec-cond-top-er, a0 instruction 32-3 immediately following the instruction 32-2 is executed. In this processing, the head address in the exec-cond-tb$_1$ is modified in order to create a new executable condition and the executable condition for the size 2 is registered. More specifically, the head address is held in the a1 under the direction of a movea.1 (a0), a1 instruction, all of sizes in executable condition to be added to the exec-cond-top-pr, which are represented by 28 bytes (bracket-size) as shown in FIG. 21, are added for modification under the direction of an addi.1 $ bracket-size, (a0) instruction, the size 2 is substituted into the ELT-CONT for the new executable condition under the direction of a move $2, 8 (a1) instruction and thereafter branching to the ADD-CSI is done under the direction of a bra ADD-CSI instruction, as indicated at 32-4. In the ADD-CSI processing, it is first examined whether an executable condition has already been present on the rule-cont-tb$_1$ under the direction of a compi.1 $-1, (a4) where a4 is an address corresponding to the rule-no of the rule-cont-tb$_1$, as indicated at 32-5. Here, since execution start proceeds and "−1" is substituted, branching to ADD-CS2 is done under the direction of the succeeding beg ADD-CS2 instruction 32-6. In the ADD-CS2, the flag "−1" is substituted into the head address of rule-cont tb$_1$ table held in the a1 (this corresponds to BACK of the executable condition shown in FIG. 21, indicating that another executable condition does not exist) and subsequently branching to MAKE is done under the direction of a bra MAKE instruction, as indicated at 32-7. In the MAKE, the address corresponding to the rule-no of rule-cont-tb$_1$ table held in the a4 is substituted into NEXT of additional executable condition, the head address of the additional executable condition is then registered in the rule-cont-tb$_1$ under the direction of a move.1 a1, (a4) instruction, a time tag address holding address for the additional executable condition is substituted into the a4, the time tag address for fa$_1$ is then stored under the direction of a move.1 a2, (a4)+instruction, the sectioning mark "−1" for the time tag address is then stored under the direction of a move.1 $-1, (a4)-+instruction, the value fa$_1$ of the variable X is then stored under the direction of a move.1 a1, (a4)+instruction and finally the flag "−1" indicative of the end of the variable is stored, as indicated at 32-8. By this, the new executable condition can be created completely and connection to the rule-cont-tb$_1$ can be perfected. Then, execution of instructions at the beginning of FIG. 33 will follow but in this embodiment, conflict resolution based on the latest strategy is carried out and therefore a rule which is valid nuder the maximum time tag value is executed preferentially. To this end, the executable condition created by the instructions in FIG. 32 is registered in the cs-max-tb$_1$ holding addresses of executable conditions having the maximum time tag in respect of each rule. More specifically, the cs-max-tb$_1$ address is held in the a0 under the direction of a movea.1 $cs-max-tb$_1$, a0 instruction and added with the d$_7$ holding the offset of rule-no to determine an address of entry corresponding to the rule-no of the cs-max-tb$_1$, and it is examined under the direction of a cmpi.1 $-1, (a0) instruction whether the executable condition having the maximum time tag or the maximum executable condition exists, as indicated at 33-3. Because the inference initiation value has not been reached yet, branching to MAX-CH1 is done under the direction of the succeeding instruction beq MAX-CH1 instruction 33-4. In the MAX-CH1, a move.1 a1, (a0) instruction for registering the address a1 of the newly created executable condition in the cs-max-tb$_1$ is executed and branching to FAIL is done under the direction of a bra FAIL instruction, as indicated at 33-5.

As a result, the executable condition address has also been substituted into the cs-max-tb$_1$.

Subsequently, a label FAIL 33-6 in FIG. 33 will be executed but in this phase it is important to consider what is meant by the value set in the a0 under the direction of a movea.1 (SP), a0 instruction. The RCB has been created on the stack and the R0 has been stored in the RCB at the beginning of the rule condition part and thereafter the FCB has been created before execution of the slot c instruction code for fa$_1$ but it has been deleted under the direction of the delete-FCB. Likewise, the FCB has been created before execution of the slot b instruction code for fa$_1$ but has also been deleted under the direction of the delete-FCB instruction. As a result, the address R0 has been substituted into the a0. In the R0 shown in FIG. 33, LBL0 is substituted into the d$_7$ of the NGR under the direction of the delete-RCB instruction 33-1 and after deletion of the RCB, branching to LBL0 in FIG. 25 is performed under the direction of a move.U d$_7$, a0 instruction and ka jmp (a0) instruction, as indicated at 33-2.

In this manner, the initialization of the executable condition is completed. This program is featured in that when the FCB remains, the executable condition for another frame can be added and eventually, at the time that return to the label LBL0 is completed, addition of all executable conditions is completed.

Subsequently, inference is started from the LBL0. Firstly, an executable condition having the maximum time tag among the registered executable conditions is determined and a conflict resolution processing for selecting a rule execution part valid under the executable condition is executed. To this end, in the LBL0, the cs-max-tb$_1$ address is set in the a4 and the executable conditions having the maximum time tag for individual rules are compared with each other. Specifically, the d1 used for offset holding is cleared under the direction of a clr. ld1 instruction in order to determine the entry address for the cs-max-tb$_1$ and then max-cond in the cs-max-tb$_1$ is substituted into the d0 under the direction of a move.1 (a4)+, d0 instruction, as indicated at 25-2. Thereafter, in order to decide whether the max-cond of all rules is examined, comparison is carried out under the direction of a compi.1 $-2, d0 instruction and because of only one rule being existent in the present embodiment, branching to SOLVED is not done at the succeeding beq SOLVED instruction but a cmpi.1 $0, d0 instruction following the beq SOLVED instruction is executed, as indicated at 25-3. The additional executable condition address is currently set in the cs-max-tb$_1$ as described previously and therefore, after execution of the succeeding beq SEARCH instruction, an addi.1 $4, d1 instruction following the beq SEARCH instruction is executed to set the offset in the cs-max-tb$_1$ in the d1, as indicated at 25-4. Subsequently, branching to LBL1 is done under the direction of a bra LBL1 instruction as indicated at 25-5 and then, because of only one rule being existent, "−2" is substituted into the d0 under the direction of a move.1 (a4)+, d0 instruction in LBL1, so that branching to SOLVED in FIG. 26 is done under the direction of the succeeding cmpi.1 $-2, d0 and beq SOLVED instructions. The above processing is such that when "0" exists in the cs-max-tb$_1$, the maximum executable condition is determined through SEARCH. Since in the present embodiment "0" does not exist currently, SEARCH is not executed and branching to SOLVED is done where the maximum executable condition among individual rule executable conditions and the corresponding rule are determined. To this end, the cs-max-tb$_1$ address is set in the a4 under the direction of the first instruction movea.1 $cs-max-tb$_1$, a4, a candidate for the maximum executable condition address is substituted into the a3 and the offset (the value obtained by quadrupling the rule number) in the cs-max-tb$_1$ at that time is substituted into the d1. More specifically, the d1 is first rendered to be "0" under the direction of a clr. d1 instruction, the maximum executable condition is substituted into the a3 under the direction of the succeeding movea.1 (a4)+, a3 instruction, it is decided under the direction of the ensuing comparison/branching instruction whether all of the cs-max-tb$_1$ tables are examined, and because of "−2" being negated, the ensuring cmpa.1 $-1, a3 and bne LBL11 instructions are executed, as indicated at 26-1. Then, because of "−1" being negated, branching to LBL11 is done. In the LBL11, the cs-max-tb$_1$ address is first set in the a4 and after the d2 is cleared, the cs-max-tb$_1$ is again examined from the start. Then, max-cond is substituted into the a2 under the direction of ja movea.1 (a4)+, a2 instruction in LBL2 and as in the precedence, it is decided whether "−1" or "−2" is valid. Because the same address is substituted into the a3 and a2, under the direction of a bne CMP instruction, branching to CMP is done, as indicated at 26-2, where under the direction of a movea.1 12 (a3), a0 instruction, the contents of an address resulting from addition of "12" to the a3 used as the register holding an address of the executable condition having the maximum time tag among all of rules is substituted into the a0, as indicated at 26-3. As will be seen from FIG. 21, this corresponds to substitution of the time tag address held in the executable condition into the a0. Similarly, under the direction of the succeeding movea.1 12 (a2), a1 instruction 26-4, the time tag address for the executable condition is also substituted into the a1 and subsequently time tag values are compared with each other. Before then, it is examined under the direction of a cmpi.1 $-1, (a0) instruction whether the contents (a0) of a0 representative of the time tag address is "−1". Because of the contents not being "−1" currently, branching is not done in the succeeding beq LBL8 instruction, the time tag value is substituted into the d3 under the direction of the ensuing move.1 (a0)+, d3 instruction, the time tag value to be compared with the former time tag value is substituted into the d4 under the direction of the ensuing move.1 (a1)+, d4 instruction, and branching to LBL8 is performed under the direction of the ensuring cmpi.1 d4, d3 instruction when the contents of d3 is larger than the contents of d4, in order to compare the maximum executable condition for the succeeding rule with the maximum executable condition registered in the a3, as indicated at 26-5. The above processing is repeated. On the other hand, when d4 is larger than d3, branching is done under the direction of a blt LBL9 instruction 26-6 for the purpose of exchange of the maximum executable condition. Here, under the direction of the first movea.1 a2, a3 instruction in LBL9, the maximum executable condition address is substituted into the a3, information corresponding to its rule number is set in the d1 and thereafter branching to LBL8 is done in order to perform the succeeding comparison, as indicated at 26-7. At present, since only one rule is existent and the same executable condition address is held in the a2 and a3, branching to LBL12 is done under the direction of a bra LBL12 instruction 26-8. Then, because of only one time tag, after execution of the cmpi.1 $-1, (a0) and beq LBL8 instructions, branching to LBL8 is performed, "4" is added to the d2 and branching to LBL2 is done, as indicated at 26-9. In the LBL2, max-cond for the succeeding rule in the max-cs-tb$_1$ is substituted int. the a2 under the direction of the move.1 (a4)+, a2 instruction. But because of only one rule being existent in the present embodiment, branching to MAX-END is done under the direction of the ensuing cmpi.1 $-2, a2 and beq MAX-END instructions, thereby ensuring that the address of the executable condition having the maximum time tag among all rules can be held in the a3 and information corresponding to its rule number can be held in the d1. Subsequently, because the requisite information is thus determined, an address of a rule execution part to be executed may be determined from the rhs-adr-tb$_1$ by using the d1 and branching may be done in the MAX-END. Before then, however, the rule execution part executable must be deleted. This is because unless a new executable condition is added, the same rule will be executed during each cycle with the result that inference loops and proceeds increasingly infinitely. Thus, in the MAX-END, deletion of the executable condition is first effected and thereafter an address of a rule execution part to be executed is determined and branching is performed. To this end, BACK value of an executable condition desired to be deleted is substituted into the a1 under the direction of a movea.1 a3, a0 instruction and a movea.1 (a0), a1 instruction at the beginning and NEXT value is substituted into the a2 under the direction of the ensuring adda.1 $4, a0 and movea.1 (a0), a2 instructions, as indicated at 27-1. Subsequently, under the direction of a move.1 a1, (a2) instruction, one succeeding executable condition address is substituted into BACK of one preceding executable condition and then, when the BACK value is "−1", branching to label LBL13 is performed under the direction of a cmpi.1 $1, a1 instruction, as indicated at 27-2. At present, because of only one executable condition being existent, BACK value −1 of the executable condition to be deleted is substituted into the rule-cont-tb$_1$ and thereafter branching to LBL13 is done. In the LBL13, the deleted executable condition is registered in the cs-free-tb$_1$. Thus, the address is first substituted into the a0 under the direction of a movea.1 $cs-free-tb$_1$, a0 instruction and a move.1 8 (a3), d0 instruction is executed in order to substitute the executable condition to be deleted into the a0, as indicated at 27-3. Subsequently, under the direction of adda.1 d0, a0 and move.1 (a0), d0 instructions, a free pointer in the cs-free-tb$_1$ is substituted into the d0 and the executable condition address to be deleted which is designated by the a3 is registered in the cs-free-tb$_1$ under the direction of a move.1 a3, (a0) instruction, as indicated at 27-4. Then, in order to couple an executable condition which has already been registered and the executable condition just added, the d0 is substituted into BACK of the added executable condition under the direction of a move.1 d0, (a3) instruction, as indicated at 27-5. Subsequently, in fear of a change also occurring in the rule-cont-tb$_1$ due to the deletion, an executable condition address is substituted into d0 under the direction of a movea.1 rule-cont-tb$_1$, a0 instruction, an adda.1 d1, a0 instruction and a move.1 (a0), d0 instruction and because of "−1" set up in the aforementioned processing, branching to LBL15 is done under the direction of the ensuring cmpi.1 $-1, d0 and beq LBL15 instructions, as indicated at 27-6. Thus, after the deletion, "−1" is substituted into the rule-cont-tb$_1$ and no executable condition exists. In the LBL15, because of the absence of the rule executable condition, setting is carried out such that "−1" is substituted into the corresponding cs-max-tb$_1$ to exclude the maximum rule executable condition, too, as indicated at 27-7. But, in the presence of an executable condition, "0" is substituted into the cs-max-tb$_1$, as indicated at 27-8. At present, "−1" is valid. Subsequently, the rhs-adr-tb$_1$ is substituted into the a0, a rule execution part instruction code address is held in the a0 under the direction of adda.1 d1, a0 and movea.1 (a0), a0 instructions, a return address is set in the NGR (d$_7$) under the direction of the succeeding move.1 $CYC, d$_7$ instruction and thereafter branching to the rule execution part instruction code is done under the direction of a jmp (a0) instruction, as indicated at 27-9. The rule execution part instruction code (FIG. 28) is for adding "1" to slot $\underline{b}$ of a frame designated by the variable X. Accordingly, in the execution part, the fr-val-tb$_1$ designated by the variable X is first searched. More specifically, an fr-data-tb$_1$ address is first substituted into the a0 under the direction of a movea.1 $fr-data-tb1, a0 instruction, the value (being fa$_1$ currently) of the variable X held in the executable condition is then substituted into the d1 under the direction of a move.1 20 (a3) d1, the entry offset of variable X frame in the fr-data-tb$_1$ is determined under the direction of an lsl.1 $2, d1 instruction in order to determine the fr-val-tb$_1$ address, the entry address is substituted into the a0 under the direction of an adda.1 d1, a0 instruction, the frb-mid-tb$_1$ address is then substituted into the a0 under the direction of a move.1 (a0), a0 instruction as will be seen from FIG. 10 and the fr-val-tb$_1$ address is also substituted into the a0 under the direction of a movea.1 (a0), a0 instruction, as indicated at 28-1. In this manner, the fr-val-tb$_1$ address designated by the variable X can be found.

Subsequently, under the direction of a lea.1 4 (a0), a1 instruction, the time tag address for the variable X frame is substituted into the a1 and then, as will be seen from the fr-val-tb$_1$ structure in FIG. 24, it is confirmed under the direction of a cmpi.1 $-1, 12 (a0) instruction that the slot number is not "−1", as indicated at 28-2. Accordingly, in the succeeding beq ERR 1 instruction, branching to error processing address ERR 1 is not performed, an address of the first slot of the variable X frame is substituted into the a0 under the direction of the ensuing lea.1 20 (a0), a0 instruction and it is examined under the direction of the ensuing cmpi.1 $b, 8 (a0) instruction whether the slot is identical to the slot $\underline{b}$ desired to be referred to, as indicated at 28-3. As will be seen from FIG. 24, the slot $\underline{b}$ exists to stand for the first slot of the frame X (fa1) and therefore branching to LBL20 as done under the direction of a beq LBL20 instruction, as indicated at 28-4, and an addi.1 $1, 12 (a0) instruction is executed. Carried out under the direction of this instruction is addition of "1" to the value of slot b at present, which is the main processing in execution part process, as indicated at 28-5. subsequently, in order to modify the time tag, an address of the global timer is substituted into the a0, the value of the timer is modified under the direction of an addi.1 $1, (a0) instruction and the modified value is substituted into the time tag of the variable X (fa1) frame under the direction of a move.1 (a0), (a1) instruction, as indicated at 28-6. Subsequently, under the direction of a move.1 20 (a3), d0 instruction, the variable X is substituted into the d0, the time tag address for the modified frame is substituted into the a3 under the direction of the succeeding move.1 a1, a3 instruction and the offset of table is substituted into the d0 under the direction of the ensuing lsl.1 $2, d0 instruction, as indicated at 28-7. Consequently, the rule condition part instruction code having the rule condition part referring to the variable frame X can be executed while limiting it as far as possible. Specifically, the fr-no-tb$_1$ address can be substituted into the a0 under the direction of a move.1 $ fr-no-tb$_1$, a0 instruction, the fr-no-tb$_1$ entry address can be determined under the direction of an adda.1 d0, a0 instruction, the slot-no-tb$_1$ address can then be substituted into the a0 under the direction of a movea.1 (a0), a0 instruction, the entry offset of slot b̄ can be substituted into the d0 under the direction of a move.1 $b, d0 instruction, the entry address can be substituted into the a0 under the direction of an adda.1 d0, a0 instruction and finally, under the direction of a move.1 (a0), a0 instruction, the slot-no-tb$_1$ can be read out and the rule control instruction address can be substituted into the a0, as indicated at 28-8. Further, under the direction of the ensuing move.1 4 (a3), a4, the constant number instruction code address for the modified frame fa1 is substituted into the a4 and the rule control instruction shown in FIG. 29 is executed at the ensuing jmp (a0) instruction, as indicated at 28-9.

In the rule control instruction shown in FIG. 29, the register a4 for holding the constant number instruction code address is saved to the stack under the direction of a create-RCB instruction, the d7 into which the CYC address shown in FIG. 27 has been substituted is then substituted into the stack and finally the succeeding address is saved to the stack under the direction of a jsr RL1 instruction and thereafter branching to RL1 is done, as indicated at 29-1.

The RL1 is an instruction code for performing deletion of conflict set in the rule condition part instruction code. More particularly, all rules, in respect of which the slot b̄ for the variable X (fa1) frame is modified at the rule execution part and therefore the time tag address a3 for the modified frame is contained in the rule executable condition, must be deleted and an executable condition newly valid under the newly modified frame must be determined and added to the conflict set. Here, deletion of the executable condition containing the time tag address held in the a3 is executed.

In the preparatory processing for the deletion, the maximum executable condition address (max-cond) for a rule in question is substituted into the d3 under the direction of a movea.1 $cs-max-tb$_1$, a0 instruction, an adda.1 d1, a0 instruction and a move.1 (a0), d3 instruction and then, the exec-cont-pr is substituted from the rule-cont-tb$_1$ coupling executable conditions for the rule into the a2 under the direction of a movea.1 $rule-cont-tb$_1$, a0 instruction, an adda.1 d1, a0 instruction and a movea.1 (a0), a2 instruction, as indicated at 29-2. Then, if "a2 = −1" is determined at the succeeding instruction cmpa.1 $−1, a2 instruction, indicating that no condition exists which makes the rule executable, branching to CS-END will be done under the direction of the ensuing beq CS-END instruction. Since in this embodiment "−1" is substituted into both the cs-max-tb$_1$ and rule-cont-tb$_1$ tables, branching to CS-END is in effect carried out, as indicated at 29-3. Generally, however, a plurality of executable conditions exist in the rule in many applications and therefore an instance will now be considered where branching to CS-END is not done at the beq CS-END instruction. In this case, a time tag address for a rule executable condition in the exec-cond-pr is substituted into the d2 under the direction of a move.1 12 (a2), d2 instruction, it is checked at the succeeding cmpa.1 d2, a3 instruction whether d2 and a3 are equal to each other, and if inequality is determined, branching to NEXT is done and the succeeding executable condition is examined, as indicated at 29-4. If equality is determined, the rule executable condition of interest must be deleted. But before then, it is examined under the direction of a cmp.1 a2, d3 instruction whether an executable condition to be deleted is held in the cs-max-tb$_1$ and if the answer is YES, branching to MAX-DEL is done under the direction of a beq MAX-DEL instruction, as indicated at 29-5 and "0" is substituted temporarily into the max-cs-tb$_1$, as indicated at 30-1. Subsequently, branching to CUTO is performed and the rule executable condition of interest is actually deleted as indicated at 29-6 and branching to FREE is done to effect connection to the cs-free-tb$_1$ and return to LOOP1 is carried out as indicated at 30-2. In the LOOP1, the cmpa.1 $-1, a2 instruction for checking the executable condition for its absence is executed and if the answer is YES, branching to CS-END is done. The deletion processing has been outlined hereinbefore. Now, in the present embodiment, after branching to CS-END, the value "0" which has temporarily been substituted into the cs-max-tb$_1$ is rewritten to "1", if the rule-cont-tb$_1$ is "−1" as indicated at 30-3, under the direction of a movea.1 $ rule-cont-tb$_1$, a0 instruction, an adda.1 d1, a0 instruction, a cmpi.1 $-1, (a0) instruction and a bne C-END instruction, as indicated at 30-4 and branching to LHS is done under the direction of a bra LHS instruction. But if "−1" is negated at the cmpi.1 $-1, (a0) instruction, indicating that "0" should remain in the cs-max-tb$_1$, nothing is done and branching to LHS (31-10 in FIG. 31) is effected at the bra LHS instruction, as indicated at 30-5.

The LHS is a process routine for performing matching decision in the rule condition part instruction code. In this routine requiring that the constant number instruction code be first executed to substitute information necessary for matching decision into the register and then matching be returned to a decision routine, a return address L0 is substituted into the NGR under the direction of a move.1 L0, d7 instruction and thereafter branching to the constant number instruction code fa1 is done under the direction of a jmp (a4) instruction, as indicated at 31-10. The constant number instruction cde for fa1 is in FA1 shown in FIG. 36 and it is clear that after substitution of the f̄ā into the d0, of the fa1 into the d1, of the time tag address-tag 1 for fa1 into the a2, of the address of slot b̄ ito the d2 and of the address of slot c̄ into the d3, branching to address L0 designated by the NGR is done. Consequently, in L0 shown in FIG. 31, matching decision on @ c=1 is carried out under the direction of a move.1 d3, a0 instruction, a cmpi.1 $1, (a0) instruction and a bne FAIL instruction and because of @ c=1 being valid currently, matching decision on @ b<4 is carried out under the direction of the ensuing move.1 d2, a0 instruction, cmpi.1 $4, (a0) instruction and bge FAIL instruction, as indicated at 31-11. Since at present the value of @b is "1" resulting from addition of "1" at the rule execution part and satisfies the condition, branching to cnflict set addition processing is done under the direction of a bra ADD-OS instruction, as indicated at 31-12. In other words, as has been described in connection with the conflict set initialization, the conflict set addition processing is such that a new rule executable condition is added to the conflict set by using the register d1 holding the value of variable X and the register a2 holding the time tag address. This processing has been detailed in connection with the conflict set initialization and its procedure will not be described herein.

When the conflict set addition is completed through the operation of the present embodiment detailed hereinbefore, movea.1 (SP), a0 and jmp (a0) instructions in FAIL (33-6 in FIG. 33) are executed without fail, as indicated at 33-6 and because of the presence of the RCB on the stack, and adda.1 $4 instruction following the jsr RL1 in FIG. 29 and the ensuing move.1 (SP)+, d7 instruction, movea.1 (SP)+, a4 instruction and bra RL2 instruction are executed, as indicated at 29-7. Here, the CYC address shown in FIG. 27 is loaded on the d7. Subsequently, in the RL2 shown in FIG. 33, branching to CYC in FIG. 27 is in effect performed under the direction of the movea.1 d7, a0 and jmp (a0) instructions, as indicated at 33-2. Since inthe CYC a bra LBLO instruction 27-10 is present, branching to LBLO in FIG. 25 is done and the conflict set resolution processing standing for the first cycle of inference is re-started. As described above, for inference, addition of "1" to the slot b of the variable X (fal) frame is executed repeatedly until the condition decision @ b<4 becomes unsatisfied. Then, when @ b<4 becomes unsatisfied, the FAIL is executed without addition of the executable condition to the conflict set to carry out the operation described hereinbefore and the inference ends at a bre END instruction as indicated at 26-1 in FIG. 26 in the conflict resolution processing.

In the foregoing embodiment, the frame is used as an example of the fact and rules and frames are converted into mechanical language instructions to carry out inference but in general, when a fact not having the concept of the master and slave relation is employed, the fact may obviously be converted into a machine language instruction set and executed in a simpler manner.

Also, when description is given using rules and facts in various systems such as abnormality diagnostic systems and expert systems, inference can be carried out at high speeds by using the means of the present invention.

For example, the present invention is widely applicable to industrial systems including an abnormality diagnostic system such as an electric power system abnormality diagnostic system, an electric power system failure recovery guidance system, a water supply/drainage plant abnormality diagnostic system and a reactor abnormality diagnostic system, a steel production continuous support system for cooperative processing among processes, a water supply/drainage information control coordination system, an electric power demand/supply control system, a power distribution load interchange system and a furnace control system.

Each of the above systems has a knowledge base comprised of a rule having a condition part for designating an applicable condition and an execution part for designating execution of action and a fact possessing a plurality of attributes which can take values, a memory unit for storing the knowledge base, a processor for executing machine language instructions stored in the memory unit, and means for converting both of the fact and rule into machine language instruction sets executable by the processor and executing inference, wherein a state of a real system is fetched as a value of an attribute of the fact into the knowledge base, the machine language instruction set of the fact has the function of transferring the attribute value of the fact to a specified location, and the machine language instruction set of the rule performs inference by referring to the specified location, thereby diagnosing abnormality and creating control information.

The present invention intends to improve inference performance and is featured in that both the rule and fact are converted into machine language instructions and executed. Further, in contrast to the RETE, no intermediate results are involved in the present invention. Therefore, fundamentally, unmodified frames are also referred to by the rule condition part and as a result the number of pattern matching operations is increased in comparison with the RETE algorithm. While the present invention features the elimination of creation and deletion of the intermediate results, the RETE algorithm is based on the intermediate results and is considered to be effective to improve the performance more than the embodiment of the present invention if the intermediate results are utilized effectively. To examine trade-off between the omission of the intermediate results and the utilization thereof, evaluation is carried out using a bench mark program as shown in FIG. 37. The rule shown in FIG. 37 has two conditions of which a first condition 37-1 refers to a frame indicated by a variable X and a second condition 37-2 refers to all frames Y belonging to a class fb. On the other hand, a slot b of the frame X is modified at the rule execution part 37-3. Consequently, intermediate results of the second condition are not modified. This signifies that while the RETE can utilize the intermediate results without alternation as the number of frames to be referred to by the second condition increases, the scheme of the present invention is required to refer to the frame and perform five pattern decision operations on slot el=2, ... , slot 35=2. Then, evaluation is carried out with the number of frames belonging kto the class fb referred to by the second condition part increased from 5 (fb1 to fb5) to 30 (fb1 to fb30) by way of 20 (fb1 to fb20). The RETE algorithm is evaluated using an interpreter type inference tool based on existing RETE algorithm and formed on E-7300 manufactured by Hitachi, Ltd. (16.7 MHz MC 68020, 16 MB memory capacity) and on the other hand the scheme featuring the present invention is evaluated by tracing the execution instruction through hand-compile to count machine cycles.

Figure 38:
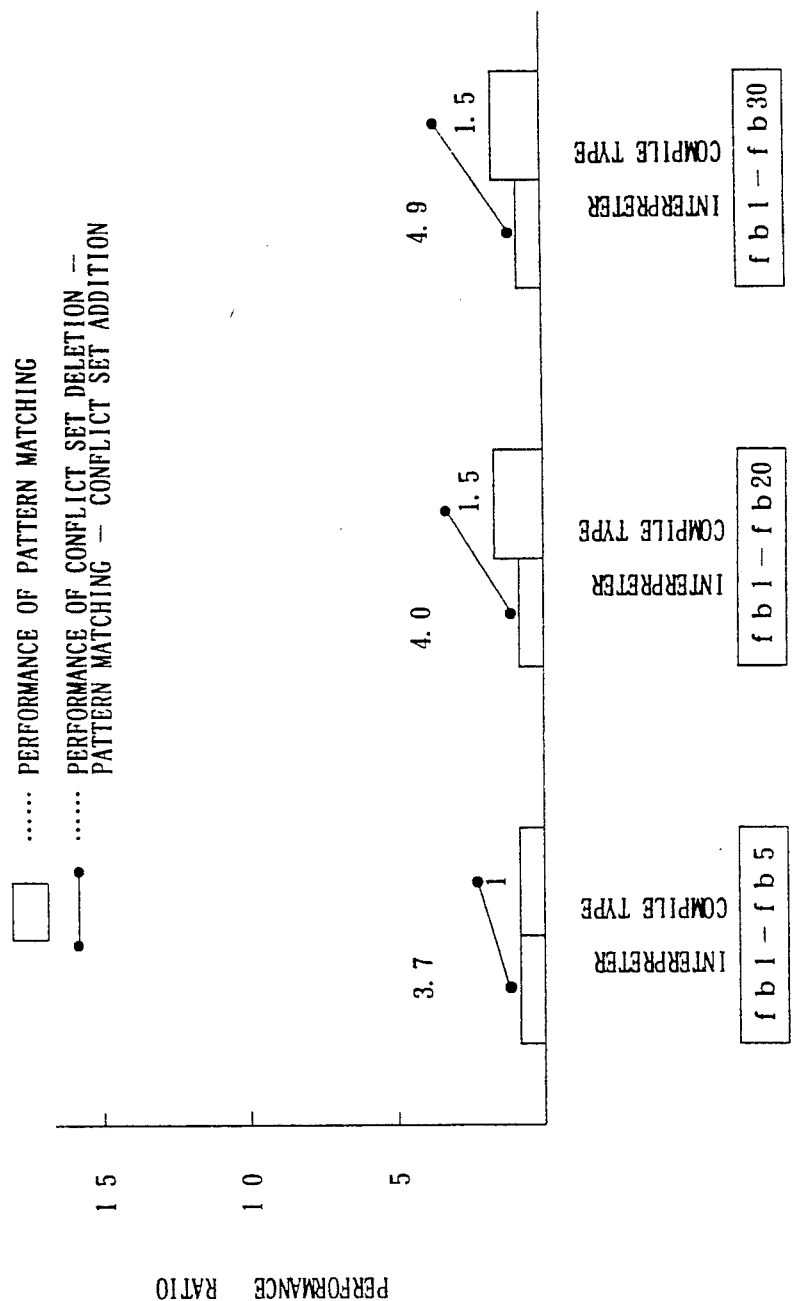
FIG. 38 is a graphic representation showing the results of performance evaluation based on the comparison in FIG. 37.

FIG. 38 shows performance evaluation results obtained by the inference tool based on the interpreter type RETE and those obtained by the compile type scheme based on direct conversion into MC 68020 instructions.

In FIG. 38, a bar graph is illustrative of pattern matching performance (performance obtained during an interval of time ranging from a point immediately after completion of the conflict set deletion processing to a point immediately before start of the conflict set addition processing), and a polygonal line graph is on the other hand illustrative of performance of so-called overall pattern matching including conflict set deletion, pattern matching operation and conflict set addition. As demonstrated in FIG. 38, pattern matching performance of the compile type scheme according to the present invention is evaluated in relation to performance of the interpreter based on the RETE such that the performance is substantially the same for the number of frames being 5 (fb1 to fb5) and the processing speed is increased by 1.5 times for the number of frames being 20 and 30. The above results evidence that the scheme of the present invention is advantageous over the RETE without exception and the existence of the aforementioned trade-off is negated. Accordingly, examination and analysis have been conducted to find that the operation to produce new intermediate results by merging a newly prepared frame fa1 at the first condition and the intermediate results at the second condition causes a bottleneck. This impairs superiority of the RETE even when the number of frames is increased, leading to the results as shown at the bar graph in FIG. 38. And, in terms of the overall pattern matching performance, it has been proven that the scheme of the present invention capable of performing the conflict set deletion and addition with high efficiency can increase the processing speed by 4 to 5 times. This signifies that the difference in performance can be amplified in the case where the intermediate results can not be utilized effectively and the RETE can not fulfil itself satisfactorily. for such a case, performance is evaluated using a bench mark program 2 as shown in FIG. 39 and a bench mark program 3 as shown in FIG. 40. The bench mark program shown in FIG. 40 is for a bench mark having 2 rules and 5 frames and the RETE is unskilled in handling this program. In connection with the above two bench marks, performance evaluation is carried out using an interpreter type inference tool based on the RETE and formed on E-7700 manufactured by Hitachi, Ltd. and a compile type scheme of the present invention. The results are shown in FIG. 41, indicating that inference performance obtained with the interpreter type inference tool based on the RETE is represented by 714 rules/s for bench mark 2 and 303 rules/s for bench mark 3 and on the other hand inference performance obtained with the compile type scheme of the invention is represented by 60052 rules/s for bench mark 2 and 17766 rules/s for bench mark 3, where "rules/s" is the number of rules executed per second and provides an index of evaluation of the inference performance. The performance obtained with the compile type scheme is fairly higher than that obtained with the interpreter, amounting to 84 times for bench mark 2 and 58 times for bench mark 3.

The effects of the present invention have been described. It should be appreciated that the compile type scheme converting rules and facts into machine language instructions may be applied effectively even to the case where the intermediate results remain as in the case of the RETE. For example, by adding a means for preparing the intermediate results only when the rule condition part refers to the constant number frame, the processing speed can be increased further because as the condition for the constant number frame, only the time tag for the frame of interest may be held in the form of the intermediate results and therefore, memory control is not needed.

In this manner, a further increase in the processing speed can be ensured in accordance with the present invention but it is essential that the processing speed can be increased through the inference wherein as described previously rules and facts are converted into machine language instruction sets and executed.

What is claimed is:

1. A compile type knowledge processing system, comprising:
   a processor having means for generating instructions, means for executing instructions, and N registers, including first to sixth registers, a stack pointer register, and a plurality of slot registers;
   a knowledge base including a plurality of sets, each set having a rule and a frame, said rule including a condition part, expressing a condition of applying the rule according to a variable and representing renewal of a frame slot of an indicated frame and an execution part, said frame including M slots; and
   a memory unit including:
      (a) a first area storing said knowledge base;
      (b) a second area storing a machine language instruction generated by compiling a rule and a fact of said knowledge base;
      (c) a third area serving as a stack in an execution of machine language instructions; and
      (d) a fourth area storing a conflict set table, a conflict set control table, a rule execution part table, and a rule condition part table;
   wherein said means for generating instructions includes means for generating pattern-match instructions including conflict-resolution instructions, rule-execution-part instructions, rule-control instructions, rule-condition-part instructions, frame-control instructions and frame instructions, said rule-condition-part instruction including a conflict-set-delete instruction, a matching decision instruction, a conflict-set-add instruction and a rule/frame control instruction; and
   wherein said means for executing instructions comprises:
      (a) means responsive to a first conflict-resolution instruction for reading a time tag from said conflict set table via said conflict set control table indexed uniquely with a rule number to select a rule established under a most recent time tag, responsive to a second conflict-resolution instruction for transferring a value of a variable appearing in said execution part, responsive to a third conflict-resolution instruction for transferring a return address to said sixth register and responsive to a conflict resolution branch instruction for referring to said rule execution part table indexed with said rule number to branch to an instruction in said rule execution part corresponding to said rule number;
      (b) means responsive to a first rule-execution-part instruction for updating a value of a time tag of said indicated frame, responsive to a second rule-execution-part instruction for transferring an instruction code address of said frame to said fourth register and responsive to a rule-execution-part branch instruction for referring to said rule condition part table indexed with a number of said frame to branch an address stored at an entry in said rule condition part table;
      (c) means responsive to a rule-control create-RCB R1 instruction for storing contents of said fourth and sixth registers and an address of a next instruction and, thereafter, branching to said rule-condition-part instruction, responsive to a rule-control modify-RCB R2 instruction for restoring contents of said third area into said fourth and sixth registers and storing said next instruction address to branch a code address of said rule-condition-part instruction and, responsive to a rule-control instruction for restoring said contents of said third area into said fourth and sixth registers and updating contents of said stack pointer register to branch to a code address of said rule-condition-part instruction;

(d) means responsive to a conflict-set-delete instruction, including an instruction code, for deleting a time tag indicated with said third register from a conflict set table of said conflict set control table;

(e) means responsive to a first matching decision instruction for transferring a class name of said frame indicated with said condition part, responsive to a second matching decision instruction for transferring a frame name of said frame to said second register, and means responsive to a matching decision compare instruction for comparing a value of a K-th slot indicated for matching in said condition part with contents of a K-th slot register;

(f) means responsive to a conflict-set-add instruction for adding contents of said third register to said conflict set table;

(g) means responsive to a rule/frame control instruction for reading contents of an address indicated with said stack pointer register to branch to an address indicated with said contents;

(h) means responsive to a frame-control create-frame F1 instruction for storing contents of said first, second and sixth registers into said third area and, thereafter, branching to a code address of said frame instruction, responsive to a frame-control modify-frame F2 instruction for restoring contents of said third into said fourth and sixth registers and an address of a next instruction and, thereafter, branching to said frame-instruction code address, and responsive to a frame-control delete-frame F3 instruction for restoring said contents of said third area into said fourth and sixth registers and updating contents of said stack pointer register to branch to a code address of said frame instruction; and (i) means responsive to a first frame instruction for transferring a class name of said frame to said first register, responsive to a second frame instruction for transferring a frame name of said frame to said second register, responsive to a third frame instruction for transferring an address of a time tag of said frame to said third register, responsive to a fourth frame instruction for transferring an i-th slot value of said frame to an i-th slot register and responsive to a fifth frame instruction for branching to an address indicated with said sixth register.

* * * * *